(12) United States Patent
Kato et al.

(10) Patent No.: US 9,561,494 B2
(45) Date of Patent: Feb. 7, 2017

(54) CATALYST FOR EXHAUST GAS PURIFICATION, METHOD FOR PRODUCING THE SAME, AND EXHAUST GAS PURIFICATION METHOD USING THE SAME

(75) Inventors: Naohiro Kato, Himeji (JP); Yuta Akasaka, Himeji (JP); Yuji Ogino, Himeji (JP); Yosuke Goto, Himeji (JP)

(73) Assignees: UMICORE SHOKUBAI JAPAN CO., LTD., Tokyo (JP); UMICORE SHOKUBAI USA INC., Auburn Hills, MI (US)

( * ) Notice: Subject to any disclaimer, the term of this patent is extended or adjusted under 35 U.S.C. 154(b) by 625 days.

(21) Appl. No.: 14/003,103

(22) PCT Filed: Feb. 29, 2012

(86) PCT No.: PCT/JP2012/055132
§ 371 (c)(1),
(2), (4) Date: Nov. 14, 2013

(87) PCT Pub. No.: WO2012/121085
PCT Pub. Date: Sep. 13, 2012

(65) Prior Publication Data
US 2014/0072493 A1    Mar. 13, 2014

(30) Foreign Application Priority Data

Mar. 4, 2011   (JP) .................................. 2011-047643
Apr. 28, 2011  (JP) .................................. 2011-101608

(51) Int. Cl.
*B01J 23/00*   (2006.01)
*B01J 23/42*   (2006.01)
(Continued)

(52) U.S. Cl.
CPC ................ *B01J 23/42* (2013.01); *B01D 53/94* (2013.01); *B01D 53/944* (2013.01); *B01J 21/063* (2013.01);
(Continued)

(58) Field of Classification Search
CPC ...... B01D 53/94; B01D 53/944; B01J 21/063; B01J 21/066; B01J 21/08; B01J 21/12; B01J 23/40; B01J 23/44; B01J 23/462; B01J 23/464; B01J 23/466; B01J 23/468; B01J 23/50; B01J 23/52; B01J 35/002; B01J 35/023; B01J 35/04; B01J 37/0201; B01J 37/0215; B01J 37/0242; B01J 37/031; F01N 3/103
(Continued)

(56) References Cited

U.S. PATENT DOCUMENTS 5,610,117 A    3/1997  Horiuchi et al.
6,821,412 B1 * 11/2004  Fujukawa ................ B01J 21/04
                                                    208/210
2002/0160912 A1  10/2002  Morikawa et al.

FOREIGN PATENT DOCUMENTS

JP    2003-020227 A    1/2003
JP    2004-167354 A    6/2004
(Continued)

OTHER PUBLICATIONS

Office Action issued on Aug. 5, 2015, by the State Intellectual Property Office of People's Republic of China in corresponding Chinese Application No. 201280011804.0, and an English translation of the Office Action. (14 pages).
(Continued)

*Primary Examiner* — Colleen Dunn
*Assistant Examiner* — Haytham Soliman
(74) *Attorney, Agent, or Firm* — Buchanan Ingersoll & Rooney PC

(57) ABSTRACT

The purpose of the present invention is to provide a catalyst for exhaust gas purification, which is capable of effectively processing an exhaust gas, particularly carbon monoxide (CO) and hydrocarbon (HC) in the exhaust gas at a low temperature, and a method for producing the catalyst for exhaust gas purification. The purpose is achieved by a catalyst for exhaust gas purification, which is obtained by having a carrier that contains $Al_2O_3$ and one or more metal oxides selected from the group consisting of zirconium oxide ($ZrO_2$), cerium oxide ($CeO_2$), yttrium oxide ($Y_2O_3$), neodymium oxide ($Nd_2O_3$), silicon oxide ($SiO_2$) and titanium oxide ($TiO_2$) support one or more catalyst components selected from the group consisting of gold (Au), silver (Ag), platinum (Pt), palladium (Pd), rhodium (Rh), iridium (Ir), ruthenium (Ru) and osmium (Os). The metal oxides have particle diameters of less than 10 nm.

9 Claims, 7 Drawing Sheets

(51) Int. Cl.
    *F01N 3/10*     (2006.01)
    *B01D 53/94*     (2006.01)
    *B01J 21/06*     (2006.01)
    *B01J 21/08*     (2006.01)
    *B01J 21/12*     (2006.01)
    *B01J 23/40*     (2006.01)
    *B01J 37/02*     (2006.01)
    *B01J 37/03*     (2006.01)
    *B01J 23/44*     (2006.01)
    *B01J 23/46*     (2006.01)
    *B01J 23/50*     (2006.01)
    *B01J 23/52*     (2006.01)
    *B01J 35/00*     (2006.01)
    *B01J 35/02*     (2006.01)
    *B01J 35/04*     (2006.01)
    *B01J 35/10*     (2006.01)

(52) U.S. Cl.
    CPC ............... *B01J 21/066* (2013.01); *B01J 21/08* (2013.01); *B01J 21/12* (2013.01); *B01J 23/40* (2013.01); *B01J 23/44* (2013.01); *B01J 23/462* (2013.01); *B01J 23/464* (2013.01); *B01J 23/466* (2013.01); *B01J 23/468* (2013.01); *B01J 23/50* (2013.01); *B01J 23/52* (2013.01); *B01J 35/002* (2013.01); *B01J 35/023* (2013.01); *B01J 35/04* (2013.01); *B01J 37/0201* (2013.01); *B01J 37/0215* (2013.01); *B01J 37/0242* (2013.01); *B01J 37/031* (2013.01); *F01N 3/103* (2013.01); *B01D 2255/1021* (2013.01); *B01D 2255/1023* (2013.01); *B01D 2255/2092* (2013.01); *B01D 2255/20707* (2013.01); *B01D 2255/20715* (2013.01); *B01D 2255/502* (2013.01); *B01D 2255/9202* (2013.01); *B01D 2258/012* (2013.01); *B01J 35/1057* (2013.01); *B01J 35/1061* (2013.01); *B01J 37/0207* (2013.01); *B01J 37/0246* (2013.01)

(58) Field of Classification Search
    USPC ......................................................... 502/325
    See application file for complete search history.

(56) References Cited

FOREIGN PATENT DOCUMENTS

| JP | 2006-043637 A | 2/2006 |
|----|---------------|--------|
| JP | 4352897 B2 | 10/2009 |

OTHER PUBLICATIONS

Extended Search Report issued on Oct. 31, 2014 by the European Patent Office, in corresponding European Patent Application No. 12754944.2 (8 pages).
International Preliminary Report on Patentability (PCT/IB/373) issued on Sep. 10, 2013, by the Japanese Patent Office as the International Bureau for International Application No. PCT/JP2012/055132 (with English-language Translation).
International Search Report (PCT/ISA/210) mailed on May 22, 2012, by the Japanese Patent Office as the International Searching Authority for International Application No. PCT/JP2012/055132.
Written Opinion (PCT/ISA/237) mailed on May 22, 2012, by the Japanese Patent Office as the International Searching Authority for International Application No. PCT/JP2012/055132.

* cited by examiner

CATALYST FOR EXHAUST GAS PURIFICATION, METHOD FOR PRODUCING THE SAME, AND EXHAUST GAS PURIFICATION METHOD USING THE SAME

TECHNICAL FIELD

The present invention relates to a catalyst for exhaust gas purification, a method for producing the catalyst, and an exhaust gas purification method using the catalyst. Particularly, the invention relates to a catalyst for exhaust gas purification effective in purification of an exhaust gas, in particular, an exhaust gas from diesel engine, a method for producing the catalyst, and an exhaust gas purification method using the catalyst.

BACKGROUND ART

A large number of techniques for purifying an exhaust gas generated from internal combustions have been conventionally proposed. In particular, various techniques for purifying an exhaust gas from diesel engine have been proposed for the purpose of reduction of discharge of particulate materials (PM) and $NO_x$ contained in an exhaust gas. For example, as catalysts for purifying an exhaust gas, oxidation catalysts which oxidize carbon monoxide (hereinafter also referred to as "CO") and hydrocarbon (hereinafter also referred to as "HC") into $CO_2$ and $H_2O$, NOx storage catalysts which store nitrogen oxides (hereinafter also referred to as "NOx"), three-way catalysts which simultaneously remove NOx, Colo. and HC, and the like have been proposed.

A catalyst for exhaust gas purification is required to have high thermal durability because it is exposed to exhaust gas at a high temperature. For example, Patent Literature 1 discloses fine mixed oxide powder obtained by uniformly dispersing Zr oxide and oxide of a metal M, which does not form a solid solution with the Zr oxide, in the nm scale. Patent Literature 1 discloses that the fine mixed oxide powder has a high specific surface area and a high pore volume, and therefore, when it supports a precious metal to form a catalyst, growth of particles of the precious metal is suppressed after aging at a high temperature.

Patent Literature 2 discloses an inorganic oxide powder containing secondary particles, which contain primary particles made of $Al_2O_3$, primary particles made of metal oxides of one or at least two of $ZrO_2$, $SiO_2$ and $TiO_2$, and rare earth elements and/or rare earth oxides. The inorganic oxide powder is secondary particles obtained by dispersing primary particles made of $Al_2O_3$ and primary particles made of the above described metal oxides in a state of intervening each other and has thermal durability.

CITATION LIST

Patent Literatures

Patent Literature 1: JP-A No. 2003-20227
Patent Literature 2: Japanese Patent No. 4352897

SUMMARY OF INVENTION

Technical Problem

However, thermal durability of catalysts has been not sufficient with the techniques in the above described literatures, and further improvements have been desired. In addition, the above described literatures do not disclose a catalyst capable of effectively purifying carbon monoxide (CO) and hydrocarbon (HC) when an exhaust gas temperature is a low temperature in purifying an exhaust gas, particularly, an exhaust gas from diesel engine.

Therefore, an object of the present invention is to provide a catalyst for exhaust gas purification with high thermal durability and a method for producing the catalyst. Another object of the present invention is to provide a catalyst for exhaust gas purification, which is capable of effectively purifying an exhaust gas, particularly carbon monoxide (CO) and hydrocarbon (HC) in the exhaust gas at a low temperature, and a method for producing the catalyst.

Solution to Problem

The present inventors made intensive studies in order to solve the above described problems; as a result, they found that a catalyst for exhaust gas purification obtained by having a carrier containing $Al_2O_3$ and specific metal oxide support one or more specific catalyst components is prepared and HC and CO in an exhaust gas can be effectively purified, whereby the present invention was completed.

More specifically, the present invention provides a catalyst for exhaust gas purification, which is obtained by having a carrier that includes aluminum oxide ($Al_2O_3$) and one or more metal oxides selected from the group consisting of zirconium oxide ($ZrO_2$), cerium oxide ($CeO_2$), yttrium oxide ($Y_2O_3$), neodymium oxide ($Nd_2O_3$), silicon oxide ($SiO_2$) and titanium oxide ($TiO_2$) support one or more catalyst components selected from the group consisting of gold (Au), silver (Ag), platinum (Pt), palladium (Pd), rhodium (Rh), iridium (Ir), ruthenium (Ru) and osmium (Os), wherein the metal oxides have particle diameters of less than 10 nm.

Advantageous Effects of Invention

According to the present invention, a catalyst for exhaust gas purification capable of effectively purifying an exhaust gas, in particular, HC and CO in the exhaust gas even at a low temperature is provided.

DESCRIPTION OF EMBODIMENTS

Figure 1:
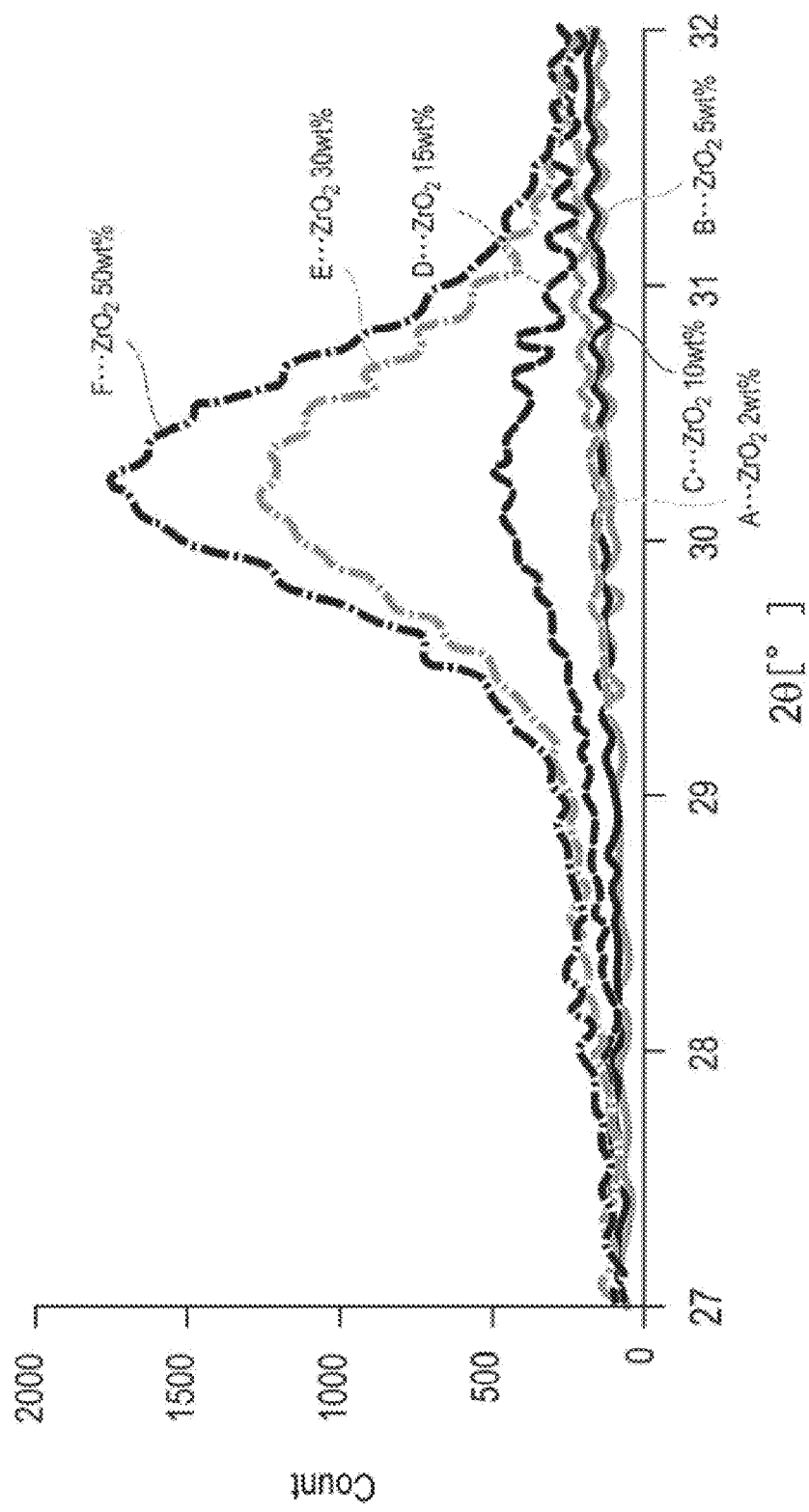
FIG. 1 is a graph showing powder X-ray diffractometry of carriers in Examples 1-1 to 1-5 and Comparative Example 1-1.

The first embodiment of the present invention provides a catalyst for exhaust gas purification, which is obtained by having a carrier that contains $Al_2O_3$ and one or more metal oxides selected from the group consisting of zirconium oxide ($ZrO_2$), cerium oxide ($CeO_2$), yttrium oxide ($Y_2O_3$), neodymium oxide ($Nd_2O_3$), silicon oxide ($SiO_2$) and titanium oxide ($TiO_2$) support one or more catalyst components selected from the group consisting of gold (Au), silver (Ag), platinum (Pt), palladium (Pd), rhodium (Rh), iridium (Ir), ruthenium (Ru) and osmium (Os), wherein the metal oxides have particle diameters of less than 10 nm (hereinafter, the catalyst for exhaust gas purification of the present invention may also be referred to simply as "the catalyst").

That is, in the first catalyst for exhaust gas purification of the invention, $Al_2O_3$, a specific metal oxide (hereinafter may also be referred to simply as "metal oxide") and a specific catalyst component (hereinafter may also be referred to simply as "a catalyst component") are essentially present. Among these components, the catalyst component is a precious metal, and since a precious metal has an oxidation activity, it converts nitrogen oxide (NOx), carbon monoxide (CO), and hydrocarbon (HC) that is an unburned component of fuel such as gasoline or fuel of a diesel engine such as light oil and heavy oil in an exhaust gas into harmless carbon dioxide, water, nitrogen, and the like, and purifies an exhaust gas.

The first catalyst for exhaust gas purification of the present invention can effectively purify carbon monoxide (CO) and hydrocarbon (HC) even at a low temperature and is preferably used particularly as a catalyst for exhaust gas purification effective in purification of an exhaust gas from diesel engine.

The mechanism capable of attaining the above described advantage is indefinite, however, can be deduced as follows. In addition, the present invention is not limited to the deduction described below at all.

In the present invention, $Al_2O_3$ and a metal oxide are a form of a mixture, which is a mixture obtained by mixing primary particles of the respective compounds in nano order. $Al_2O_3$ and the metal oxide are different in sizes of primary particles. When the metal oxide is contained in a specific content in a carrier containing $Al_2O_3$ and the metal oxide, the metal oxide has the primary particle diameter of less than 10 nm. That is, when a mass ratio of $Al_2O_3$ and the metal oxide is 99.5:0.5 to 60:40, the metal oxide has the primary particle diameter of less than 10 nm and preferably has a very fine crystal structure or an amorphous (noncrystalline) structure. $Al_2O_3$ preferably has the primary particle diameter of 10 to 100 nm.

In the present invention, $Al_2O_3$ and the metal oxide do not form a complex oxide and is a form of a mixture in nano order, as described above. This is because the metal oxide contained with $Al_2O_3$ has a property of not forming a complex oxide with $Al_2O_3$, primary particles of a complex oxide made of their oxides hardly exist, and primary particles of single oxide of each of the compounds exist. That is, the first catalyst for exhaust gas purification of the present invention is a mixture that is obtained by dispersing primary particles of $Al_2O_3$ and primary particles of the metal oxide. The form of the mixture is assumed to be a form in which primary particles of the fine metal oxide are set in primary particles of $Al_2O_3$. That is, the mixture is in a form of embedding the fine metal oxide into primary particles of $Al_2O_3$. In this time, the metal oxide, as described above, has the primary particle diameter of less than 10 nm and preferably has a very fine crystal structure or an amorphous (noncrystalline) structure.

In the first catalyst for exhaust gas purification of the present invention, $Al_2O_3$ and a metal oxide do not form a complex oxide, primary particles of the metal oxide and primary particles of $Al_2O_3$ intervene among respective primary particles, thereby considering that progress of growth of primary particles of a single oxide is inhibited and reduction of a surface area and a pore capacity are sufficiently inhibited, and dispersibility of a catalyst component to be supported can be thus sufficiently maintained. As a result, it can be presumed that the catalyst having the carrier maintains a catalytic activity even when used under the condition of a high temperature, and the catalyst can purify exhaust gas even at a low temperature.

As described above, $Al_2O_3$ and a metal oxide do not form a complex oxide, $Al_2O_3$ and the metal oxide having a primary particle diameter of less than 10 nm form a mixture in a specific mixing ratio (mass ratio) in nano order, and therefore, a catalyst for exhaust gas purification excellent in thermal durability is obtained. The oxidation catalyst of the present invention maintains a catalytic activity even when used under a condition of a high temperature, and can effectively purify (oxidize) an exhaust gas even when thermal history becomes long. That is, a precious metal effectively acts on nitrogen oxide (NOx), carbon monoxide (CO), and hydrocarbon (HC) that is an unburned component of fuel such as gasoline or fuel of a diesel engine such as light oil and heavy oil, in particular, carbon monoxide (CO) and hydrocarbon (HC), in an exhaust gas, and more successfully purifies an exhaust gas even at a low temperature.

Accordingly, the first oxidization catalyst obtained by the method of the present invention has high thermal durability and can effectively purify an exhaust gas, particularly, carbon monoxide (CO) and hydrocarbon (HC) in an exhaust gas, even at a low temperature. Therefore, the first oxidation catalyst of the present invention is particularly effective for purification of exhaust gas from diesel engine under a low temperature, even when used under a high temperature condition.

The first preferable embodiment of the present invention provides a catalyst for exhaust gas purification, which is obtained by having a carrier that contains $Al_2O_3$ and one or more metal oxides selected from the group consisting of zirconium oxide ($ZrO_2$), cerium oxide ($CeO_2$), yttrium oxide ($Y_2O_3$), neodymium oxide ($Nd_2O_3$), silicon oxide ($SiO_2$) and titanium oxide ($TiO_2$) support one or more catalyst components that are selected from the group consisting of gold (Au), silver (Ag), platinum (Pt), palladium (Pd), rhodium (Rh), iridium (Ir), ruthenium (Ru) and osmium (Os), wherein the metal oxides have particle diameters of less than 10 nm. Further, a mass ratio of aluminum oxide and the metal oxide is preferably from 99.5:0.5 to 70:30.

The second embodiment of the present invention provides a catalyst for exhaust gas purification, which is obtained by having a carrier that is constituted with 60 to 99.49 parts by mass of aluminum oxide ($Al_2O_3$), 0.5 to 20 parts by mass of zirconium oxide ($ZrO_2$), and one or more metal oxides selected from the group consisting of 0.01 to 10 parts by mass of silicon oxide ($SiO_2$) and 0.01 to 10 parts by mass of titanium oxide ($TiO_2$) (the total mass of the aluminum oxide, the zirconium oxide and the metal oxides is 100 parts by mass) support one or more catalyst components that are selected from the group consisting of gold (Au), silver (Ag), platinum (Pt), palladium (Pd), rhodium (Rh), iridium (Ir), ruthenium (Ru) and osmium (Os).

That is, in the second catalyst for exhaust gas purification of the present invention, $Al_2O_3$, $ZrO_2$, a specific metal oxide (hereinafter, among metal oxides, $SiO_2$ and/or $TiO_2$ may also be referred to as "the second metal oxide") and a specific catalyst component essentially exist. Among these components, the catalyst component is a precious metal, and since a precious metal has an oxidation activity, it converts nitrogen oxide (NOx), carbon monoxide (CO), and hydrocarbon (HC) that is an unburned component of fuel such as gasoline or fuel of a diesel engine such as light oil and heavy oil in an exhaust gas into harmless carbon dioxide, water, nitrogen, and the like, and purifies an exhaust gas.

The second catalyst for exhaust gas purification of the present invention can effectively purify carbon monoxide (CO) even at a low temperature, and furthermore, the catalyst can effectively purify carbon monoxide (CO) even after poisoning due to a sulfur component at a low temperature and is thus preferably used as an oxidation catalyst for exhaust gas purification, which is effective to purification of an exhaust gas from diesel engine.

In addition, the second catalyst for exhaust gas purification of the present invention is used in purifying of an exhaust gas containing toxic substances, specifically, for example, carbon monoxide, hydrocarbon, and sulfur oxide (SOx). That is, the present invention provides a method of effectively purifying an exhaust gas containing toxic substances (for example, carbon monoxide, hydrocarbon, and sulfur oxide (SOx)). In addition, the second catalyst for exhaust gas purification of the present invention inhibits deterioration of catalytic performance caused by poisoning of a sulfur component and thus is preferably used in purifying of an exhaust gas containing sulfur oxides (SOx), in particular, $SO_2$.

The second catalyst of the present invention contains one or more metal oxides selected from the group consisting of silicon oxide ($SiO_2$) and titanium oxide ($TiO_2$) with aluminum oxide ($Al_2O_3$) and zirconium oxide ($ZrO_2$), thus improves thermal durability of catalytic performance and can give an effect of protecting the catalytic performance from poisoning due to a sulfur component in fuel. The mechanism capable of attaining the above described advantage is indefinite, however, can be deduced as follows. In addition, the present invention is not limited to the deduction described below at all.

It can be deduced that an acidity of a carrier increases by adding silica ($SiO_2$) and/or titania ($TiO_2$) to zirconia-alumina ($ZrO_2$—$Al_2O_3$). Since SOx that is the main sulfur component in an exhaust gas is an acidic gas, affinity between the carrier and SOx can be reduced by using a carrier having a relatively high acidity. Thereby, the catalyst hardly suffers from poisoning due to a sulfur component and catalytic performance is thus maintained. Accordingly, it is assumed that an effect of protecting the catalytic performance can be imparted by adding silica and/or titania to zirconia-alumina. When an adding amount of silica and/or titania is less than or exceeds a specific range, large particles of each of titania and silica are generated, which cause deterioration of the catalytic performance.

In the present invention, $Al_2O_3$, $ZrO_2$ and the second metal oxide is a form of a mixture and primary particles of each compound are mixed in nano order to form the mixture. $Al_2O_3$, $ZrO_2$ and the second metal oxide are different in sizes of primary particles. When $Al_2O_3$, $ZrO_2$ and the second metal oxide are contained in specific contents in a carrier containing $Al_2O_3$, $ZrO_2$ and the second metal oxide, $ZrO_2$ has the primary particle diameter of less than 10 nm and preferably has a very fine crystal structure or an amorphous (noncrystalline) structure. The second metal oxide more preferably has the primary particle diameter of less than 10 nm, and particularly preferably has a very fine crystal structure or an amorphous (noncrystalline) structure. $Al_2O_3$ preferably has the primary particle diameter of 10 to 100 nm.

In the present invention, $Al_2O_3$, $ZrO_2$ and the second metal oxide do not form a complex oxide and is a form of a mixture in nano order, as described above. This is because $ZrO_2$ and the second metal oxide contained with $Al_2O_3$ have a property of not forming a complex oxide with $Al_2O_3$, primary particles of a complex oxide made of their oxides hardly exist, and primary particles of single oxide of each of the compounds exist. That is, the catalyst for exhaust gas purification of the second embodiment of the present invention is a mixture that is obtained by dispersing primary particles of $Al_2O_3$, primary particles of $ZrO_2$ and primary particles of the second metal oxide. The form of the mixture is assumed to be a form in which fine primary particles of $ZrO_2$ and fine primary particles of the second metal oxide are set in primary particles of $Al_2O_3$. That is, the mixture is in a form of embedding fine $ZrO_2$ and the fine second metal oxide into primary particles of $Al_2O_3$. In this form, $ZrO_2$, as described above, has the primary particle diameter of less than 10 nm and preferably has a very fine crystal structure or an amorphous (noncrystalline) structure. The second metal oxide more preferably has a primary particle diameter of less than 10 nm and particularly preferably has a very fine crystal structure or an amorphous (noncrystalline) structure.

In the catalyst for exhaust gas purification of the present invention, $Al_2O_3$, $ZrO_2$ and the second metal oxide do not form a complex oxide, primary particles of the second metal oxide, primary particles of $ZrO_2$ and primary particles of $Al_2O_3$ intervene among respective primary particles, thereby considering that progress of growth of primary particles of a single oxide is inhibited and reduction of a surface area and a pore capacity are sufficiently inhibited, and dispersibility of a catalyst component to be supported can be thus sufficiently maintained. As a result, it can be presumed that the catalyst having the carrier maintains a catalytic activity even when used under the condition of a high temperature, and the catalyst can purify an exhaust gas even at a low temperature.

As described above, $Al_2O_3$, $ZrO_2$ and the second metal oxide do not form a complex oxide, $Al_2O_3$, $ZrO_2$ having the primary particle diameter of less than 10 nm, and the second metal oxide form a mixture in a specific mixing ratio (mass ratio) in nano order, and therefore, an exhaust gas purification catalyst excellent in thermal durability can be obtained. The oxidation catalyst of the present invention can maintain catalytic activity used even under a high temperature condition and effectively purify (oxidize) an exhaust gas even with long thermal history and even after sulfur poisoning. That is, the precious metal effectively acts on nitrogen oxide (NOx), carbon monoxide (CO), and hydrocarbon (HC) that is an unburned component of fuel such as gasoline or fuel of a diesel engine such as light oil and heavy oil, in particular, carbon monoxide (CO) and hydrocarbon (HC), in an exhaust gas and thus can successfully purify an exhaust gas even at a low temperature.

Accordingly, the second oxidation catalyst produced by the method of the present invention has high durability and can effectively purify an exhaust gas, in particular, carbon monoxide (CO) in the exhaust gas at a low temperature even after sulfur poisoning. Therefore, the oxidization catalyst according to the present invention is particularly effective for purification of an exhaust gas from diesel engine at a low temperature even when used under high temperature conditions and when the catalyst is exposed to sulfur poisoning.

The mixture of the present invention obtained by mixing primary particles of $Al_2O_3$ and a metal oxide in nano order may also be referred to as "the first oxide mixture" hereinafter.

The mixture of the present invention obtained by mixing primary particles of $Al_2O_3$, $ZrO_2$ and the second metal oxide in nano order may also be referred to as "the second oxide mixture" hereinafter.

The first oxide mixture and the second oxide mixture are also collectively referred to simply as "the oxide mixture".

Embodiments of the present invention will be described below. Note that constituent elements and embodiments of the present invention will be specifically described in the following, but these are one part of examples of embodiments of the invention, and the invention is not limited to these contents.

Firstly, constituting components of the catalyst for exhaust gas purification of the present invention in the first embodiment and the second embodiment will be described.

<Catalyst for Exhaust Gas Purification>

1. First Oxide Mixture

The first catalyst for exhaust gas purification of the present invention contains the first oxide mixture made of $Al_2O_3$ and a metal oxide. The first oxide mixture ($Al_2O_3$ and metal oxide) is used as a carrier of a catalyst component as a preferable embodiment. The carrier may contain other components other than the first oxide mixture ($Al_2O_3$ and metal oxide), but is preferably constituted only with the first oxide mixture ($Al_2O_3$ and metal oxide). The first oxide mixture can be used in combination of two or more kinds in the present invention.

The catalyst for exhaust gas purification of the present invention contains a metal oxide as the first oxide mixture. The first metal oxide that can be used in the present invention is one or more selected from the group consisting of zirconium oxide ($ZrO_2$), cerium oxide ($CeO_2$), yttrium oxide ($Y_2O_3$), neodymium oxide ($Nd_2O_3$), silicon oxide ($SiO_2$) and titanium oxide ($TiO_2$), and these can be used solely or in combination of two or more. Among these metal oxides, $ZrO_2$, $Y_2O_3$ is preferable, and $ZrO_2$ is more preferable from the viewpoint of easiness of formation in nano order mixture with $Al_2O_3$.

As a preferable embodiment of the catalyst of the present invention, zirconium oxide ($ZrO_2$) is essentially contained. That is, the metal oxide is preferably zirconium oxide ($ZrO_2$), or a mixture of zirconium oxide ($ZrO_2$) and one or more selected from the group consisting of cerium oxide ($CeO_2$), yttrium oxide ($Y_2O_3$), neodymium oxide ($Nd_2O_3$), silicon oxide ($SiO_2$) and titanium oxide ($TiO_2$).

As another preferable embodiment of the catalyst of the present invention, one or more metal oxides selected from the group consisting of cerium oxide ($CeO_2$), yttrium oxide ($Y_2O_3$), neodymium oxide ($Nd_2O_3$), silicon oxide ($SiO_2$) and titanium oxide ($TiO_2$) are contained with zirconium oxide ($ZrO_2$). According to the embodiment, thermal durability of catalytic performance can be improved, and an effect of protecting the catalytic performance from poisoning due to a sulfur component in fuel can be imparted.

In the catalyst for exhaust gas purification of the present invention, amass ratio of $Al_2O_3$ and the metal oxide in the first oxide mixture ($Al_2O_3$ and metal oxide) is preferably 99.5:0.5 to 60:40, more preferably 99.5:0.5 to 70:30, further more preferably 99:1 to 80:20, particularly preferably 98:2 to 85:15, and the most preferably 95:5 to 90:10, based on an oxide. When the metal oxide is less than 0.5% by mass, an effect of improving catalytic performance can be hardly sufficiently obtained, and when the metal oxide exceeds 30% by mass, an amount of the metal oxide does not contribute to improvement of catalytic performance, thus being not economical. Because of containing each oxide in such a ratio, there is a tendency that primary particles of the each oxide are hardly adjacent.

In the first catalyst for exhaust gas purification of the present invention, the metal oxide in the first oxide mixture has a particle diameter of less than 10 nm, preferably less than 9 nm, more preferably less than 7 nm, further more preferably less than 6 nm, and particularly preferably less than 5 nm. The lower limit of the particle diameter of the metal oxide is preferably 0.3 nm. When the particle diameter is less than 10 nm, dispersibility of the metal oxide among primary particles of $Al_2O_3$ is improved and thermal durability is thus improved.

In addition, in the specification, the particle diameter of the metal oxide can be found by powder X-ray diffractometry (XRD) in examples described below using the Scherrer's equation. Herein, being less than 5 nm of the particle diameter means a size that cannot be observed by the powder X-ray diffractometry (XRD).

In the first catalyst for exhaust gas purification of the present invention, as a preferable embodiment, a metal oxide is less than 5 nm, and metal oxides which are bigger than or equal to 5 nm are not contained. That is, it is particularly preferable that a peak derived from the metal oxide is not observed in the powder X-ray diffractometry.

As described above, in the first oxide mixture, metal oxide is one in which a metal is not replaced or do not intrude in primary particles of $Al_2O_3$, in other words, it is a metal oxide that does not form a complex oxide with $Al_2O_3$. Accordingly, since the metal oxide of the present invention forms primary particles separated from primary particles of $Al_2O_3$, the metal oxide never forms primary particles of a complex oxide with $Al_2O_3$.

In the catalyst for exhaust gas purification of the present invention, a particle diameter of primary particles of $Al_2O_3$ in the first oxide mixture (hereinafter, also referred to as the primary particle diameter) is preferably 10 to 100 nm, more preferably 10 to 70 nm, further more preferably 10 to 50 nm, and particularly preferably 10 to 30 nm. It is preferable in the present invention that when the primary particle diameter is 10 to 100 nm, gaps among primary particles of $Al_2O_3$ where the metal oxide can exist are present in a sufficient amount. In addition, the particle diameter of $Al_2O_3$ can be measured with the transmission electron microscope.

In the first catalyst for exhaust gas purification of the present invention, as a preferable embodiment, $Al_2O_3$ and the metal oxide form secondary particles by a ratio of contents. Since the metal oxide is very fine in the present invention, the secondary particle diameter of the oxide mixture ($Al_2O_3$ and metal oxide) is preferably 10 to 100 nm, more preferably 10 to 70 nm, further more preferably 10 to 50 nm, and particularly preferably 10 to 30 nm.

A Brunauer-Emmett-Teller (hereinafter referred to as "BET") specific surface area of the first oxide mixture ($Al_2O_3$ and metal oxide) of the present invention is preferably 10 to 500 m$^2$/g, more preferably 50 to 400 m$^2$/g, further more preferably 80 to 380 m$^2$/g, and particularly preferably 100 to 350 m$^2$/g.

A use amount (supported amount) of the first oxide mixture is not particularly limited, and can be suitably selected according to a concentration of a toxic component to be purified (removed). Specifically, the use amount of the first oxide mixture (supported amount; oxide conversion) can be used in an amount of preferably 0.1 to 500 g, more preferably 1 to 300 g, and further more preferably 10 to 200 g, per 1 L of the catalyst (three-dimensional structure). As long as the use amount is within such a range, a toxic component can be sufficiently purified (removed). In addition, when the first oxide mixture is used in combination of two or more kinds, the total amount of the first oxide mixture is preferably within the above described range.

As described later, the first oxide mixture ($Al_2O_3$ and metal oxide) is obtained by adding an alkaline solution to a solution containing a water-soluble compound of Al and a water-soluble compound of one or more metals selected from the group consisting of Zr, Ce, Y, Nd, Si and Ti (for example, a water-soluble compound of Zr when the metal oxide is $ZrO_2$) to be mixed and depositing (coprecipitating) to obtain a coprecipitated product (precursor of the oxide mixture) that is a precipitate made of an $Al_2O_3$ precursor and a metal oxide precursor (coprecipitation step).

2. Second Oxide Mixture

The second catalyst for exhaust gas purification of the present invention contains the second oxide mixture made of $Al_2O_3$, $ZrO_2$ and the second metal oxide. The second oxide mixture ($Al_2O_3$, $ZrO_2$ and the second metal oxide) is used as a carrier of a catalyst component as a preferable embodiment. The carrier may contain other components other than the second oxide mixture ($Al_2O_3$, $ZrO_2$ and the second metal oxide), but is preferably constituted only with the second oxide mixture ($Al_2O_3$, $ZrO_2$ and the second metal oxide). In addition, the second oxide mixture can be used in combination of two or more kinds in the present invention.

The second catalyst for exhaust gas purification of the present invention contains one or more second metal oxides selected from the group consisting of silicon oxide ($SiO_2$) and titanium oxide ($TiO_2$) as the second oxide mixture, and these can be used solely or in combination of two or more. When $SiO_2$ or $TiO_2$ is used solely in a carrier constituted with $Al_2O_3$, $ZrO_2$ and the second metal oxide, $SiO_2$ or $TiO_2$ can be used in an amount of 0.01 to 10 parts by mass, and when $SiO_2$ and $TiO_2$ are used in combination, each of them can be contained in an amount of 0.01 to 10 parts by mass.

In the second catalyst for exhaust gas purification of the present invention, for each content in the second oxide mixture ($Al_2O_3$, $ZrO_2$ and the second metal oxide), $Al_2O_3$ is 60 to 99.49 parts by mass, $ZrO_2$ is 0.5 to 20 parts by mass, the second metal oxide is 0.01 to 20 parts by mass ($SiO_2$ is 0.01 to 10 parts by mass and/or $TiO_2$ is 0.01 to 10 parts by mass) based on oxides with respect to 100 parts by mass of the oxide mixture, and the total amount of $Al_2O_3$, $ZrO_2$ and the second metal oxide is 100 parts by mass. Due to containing respective oxides in such ratios, there is a tendency that primary particles of respective oxides are hardly adjacent.

In addition, a preferable content of each oxide is described below.

An $Al_2O_3$ content in the second oxide mixture ($Al_2O_3$, $ZrO_2$ and metal oxide) is 60 to 99.49 parts by mass, preferably 69 to 99.5 parts by mass, more preferably 70 to 99 parts by mass, further more preferably 79 to 97 parts by mass, particularly preferably 84 to 95 parts by mass, and the most preferably 89 to 94.9 parts by mass, based on oxides with respect to 100 parts by mass of the oxide mixture. When $Al_2O_3$ is less than 60 parts by mass, contents of zirconia and the second metal oxide are too much and these are thus hardly allowed to exist in fine particles or an amorphous state, and when $Al_2O_3$ is more than 99.49 parts by mass, a sufficient amount of zirconia cannot be contained and thermal durability is thus reduced.

A $ZrO_2$ content in the second oxide mixture ($Al_2O_3$, $ZrO_2$ and metal oxide) is 0.5 to 20 parts by mass, preferably 1 to 18 parts by mass, more preferably 2 to 15 parts by mass, further more preferably 3 to 12 parts by mass, and particularly preferably 5 to 10 parts by mass, based on oxides with respect to 100 parts by mass of the oxide mixture. When $ZrO_2$ is less than 0.5 parts by mass, an effect of improving catalytic performance can be hardly sufficiently obtained, and when $ZrO_2$ exceeds 20% by mass, the amount of $ZrO_2$ does not contribute to improvement of the catalytic performance, thus being not economical.

A $SiO_2$ content in the second oxide mixture ($Al_2O_3$, $ZrO_2$ and metal oxide) is 0.01 to 10 parts by mass, preferably 0.03 to 8 parts by mass, more preferably 0.05 to 7 parts by mass, further more preferably 0.08 to 6 parts by mass, and particularly preferably 0.1 to 5 parts by mass, based on oxides with respect to 100 parts by mass of the oxide mixture.

A $TiO_2$ content in the second oxide mixture ($Al_2O_3$, $ZrO_2$ and metal oxide) is 0.01 to 10 parts by mass, preferably 0.05 to 9 parts by mass, more preferably 0.1 to 7 parts by mass, further more preferably 0.25 to 5 parts by mass, and particularly preferably 0.5 to 2.5 parts by mass, based on oxides with respect to 100 parts by mass of the oxide mixture.

When the second metal oxide ($SiO_2$, $TiO_2$) is less than 0.01 part by mass, respectively, an effect of improving catalytic performance can be hardly sufficiently obtained, and when the second metal oxide exceeds 10 parts by mass, the amount of the metal oxide does not contribute to improvement of catalytic performance, thus being not economical. Due to containing respective oxides in such ratios, there is a tendency that primary particles of respective oxides are hardly adjacent.

In addition, when $SiO_2$ and $TiO_2$ are used in combination in the second oxide mixture of the present invention, the total amount of the contents is preferably 0.02 to 20 parts by mass, more preferably 0.03 to 15 parts by mass, further more preferably 0.05 to 12 parts by mass, particularly preferably 0.08 to 10 parts by mass, with respect to 100 parts by mass of the oxide mixture.

In the second catalyst for exhaust gas purification of the present invention, $ZrO_2$ in the second oxide mixture has a particle diameter of less than 10 nm. The particle diameter is preferably less than 9 nm, more preferably less than 7 nm, further more preferably less than 6 nm, and particularly preferably less than 5 nm. The lower limit of the particle diameter of the second metal oxide is preferably 0.3 nm. When the particle diameter is less than 10 nm, dispersibility of the metal oxides among primary particles of $Al_2O_3$ is improved and thermal durability is improved.

In the second catalyst for exhaust gas purification of the present invention, the second metal oxide ($SiO_2$, $TiO_2$) in the second oxide mixture has the particle diameter of less than 10 nm. The particle diameter is preferably less than 9 nm, more preferably less than 7 nm, further more preferably less than 6 nm, and particularly preferably less than 5 nm. The lower limit of the particle diameter of the second metal oxide is preferably 0.3 nm. When the particle diameter is less than 10 nm, dispersibility of metal oxide among primary particles of $Al_2O_3$ is improved and thermal durability is improved.

In addition, the particle diameters of $ZrO_2$ and the second metal oxide can be found by powder X-ray diffractometry (XRD) of examples described below using the Scherrer's equation. Herein, being less than 5 nm of a particle diameter means a size that cannot be observed by powder X-ray diffractometry (XRD).

In the second catalyst for exhaust gas purification of the present invention, as a preferable embodiment, the particle diameter of $ZrO_2$ is less than 5 nm or the particle diameter of the second metal oxide is less than 5 nm, more preferably, the particle diameters of $ZrO_2$ and the second metal oxide are both less than 5 nm, and $ZrO_2$ and the second metal oxide which are bigger than or equal to 5 nm are not contained. That is, it is particularly preferable that peaks derived from $ZrO_2$ and the second metal oxide is not observed in the powder X-ray diffractometry.

As described above, in the second oxide mixture, $ZrO_2$ and the second metal oxide are those in which a metal is not replaced or does not intrude in primary particles of $Al_2O_3$, in other words, they do not form a complex oxide with $Al_2O_3$. Accordingly, since $ZrO_2$ and the second metal oxide of the present invention form primary particles separated from primary particles of $Al_2O_3$. $ZrO_2$ and the second metal oxide never form primary particles of a complex oxide with $Al_2O_3$, respectively. In the specification, being less than 10 nm of particle diameters of the metal oxides in the second oxide mixture means that at least one of $ZrO_2$, $SiO_2$ or $TiO_2$ has a particle diameter of less than 10 nm. $ZrO_2$ is preferably less than 10 nm, and the metal oxides ($ZrO_2$, and at least one or more selected from the group consisting of $SiO_2$ and $TiO_2$), which are contained, are more preferably less than 10 nm.

In the second catalyst for exhaust gas purification of the present invention, a particle diameter of a primary particle of $Al_2O_3$ in the second oxide mixture (hereinafter also referred to as the primary particle diameter) is preferably 10 to 100 nm, more preferably 10 to 70 nm, further more preferably 10 to 50 nm, and particularly preferably 10 to 30 nm. It is preferable that when the primary particle diameter is 10 to 100 nm in the present invention, gaps among primary particles of $Al_2O_3$ where the second metal oxide can exist are present in a sufficient amount. In addition, the particle diameter of $Al_2O_3$ can be measured by a transmission electron microscope.

In the second catalyst for exhaust gas purification of the present invention, as a preferable embodiment, $Al_2O_3$, $ZrO_2$ and the second metal oxide form secondary particles by a ratio of contents. Since $ZrO_2$ and the second metal oxide are very fine in the present invention, the secondary particle diameter of the second oxide mixture ($Al_2O_3$, $ZrO_2$ and the second metal oxide) is preferably 10 to 100 nm, more preferably 10 to 70 nm, further more preferably 10 to 50 nm, and particularly preferably 10 to 30 nm.

A Brunauer-Emmett-Teller (hereinafter referred to as "BET") specific surface area of the second oxide mixture of the present invention ($Al_2O_3$, $ZrO_2$ and the second metal oxide) is preferably 10 to 500 $m^2/g$, more preferably 50 to 400 $m^2/g$, further more preferably 80 to 380 $m^2/g$, and particularly preferably 100 to 350 $m^2/g$.

A use amount (supported amount) of the second oxide mixture is not particularly limited, and can be suitably selected according to a concentration of a toxic component to be purified (removed). Specifically, the use amount of the second oxide mixture (supported amount; oxide conversion) can be used in an amount of preferably 0.1 to 500 g, more preferably 1 to 300 g, and further more preferably 10 to 200 g, per 1 L of the catalyst (three-dimensional structure). As long as the use amount is within such a range, a toxic component can be sufficiently purified (removed). In addition, when the second oxide mixture is used in combination of two or more kinds, the total amount of the oxide mixture is preferably with in the above described range.

As described later, the second oxide mixture ($Al_2O_3$, $ZrO_2$ and the second metal oxide) is obtained by adding a solution containing a water-soluble compound of Al and a water-soluble compound of Zr, or a solution containing a water-soluble compound of Al, a water-soluble compound of Zr and a water-soluble compound of Ti, to an alkaline solution or an alkaline solution containing a water-soluble compound of Si to be mixed and depositing (coprecipitating) to obtain a coprecipitated product (precursor of the second oxide mixture), which is a precipitate made of an $Al_2O_3$ precursor, a $ZrO_2$ precursor, and a second metal oxide precursor (coprecipitation step).

3. Catalyst Component

The catalyst for exhaust gas purification of the present invention contains a catalyst component. Hereinafter, the catalyst component may be also referred to as "a precious metal".

The catalyst component used in the present invention is one or more selected from the group consisting of gold (Au), silver (Ag), platinum (Pt), palladium (Pd), rhodium (Rh), iridium (Ir), ruthenium (Ru) and osmium (Os). These catalyst components may be used solely or in combination of two or more. Among these components, platinum, palladium, rhodium and iridium are preferably used, and platinum, palladium and rhodium are more preferable. Among them, it is preferable that the catalyst component is platinum or the catalyst components are platinum and palladium, and a mass ratio of platinum and palladium is 1:0 to 1:1. In addition, a combination use of platinum and palladium is more preferably used because high catalytic performance can be obtained even when an amount of expensive platinum is reduced. When platinum and palladium are used in combination, a mass ratio of platinum and palladium is preferably 1:1 to 40:1. The mass ratio is more preferably 1:1 to 30:1, and further more preferably 1:1 to 20:1. The mass ratio is particularly preferably 1:1 to 4:1, and the most preferably 1:1 to 2:1. When palladium is less than the above described range, an effect of addition is hardly obtained and when more than the range, more effects can hardly be obtained.

When platinum and palladium are used in combination, a component obtained by alloying of platinum and palladium is preferable. Herein, alloying means that platinum and palladium are present in the same particle under an electron microscope. A method of alloying is not particularly limited, and for example, a component obtained by mixing a compound containing platinum and a compound containing palladium to have a ratio within the above described range may be used. That is, a catalyst component prepared in a method in examples described below is preferable; the catalyst component is obtained by impregnating a carrier with a solution containing platinum and palladium, thereby supporting a component obtained by alloying of platinum and palladium on the carrier.

A use amount (supported amount) of a catalyst component is not particularly limited and can be suitably selected according to a concentration of a toxic component to be purified (removed). Specifically, the use amount (supported amount; precious metal conversion) of the catalyst component can be used in an amount of preferably 0.01 to 10 g, more preferably 0.3 to 10 g, per 1 L of a catalyst (three-dimensional structure). When the use amount is within such a range, a toxic component can be sufficiently removed (purified). In addition, when two or more catalyst components are used in combination, the total amount of the catalyst components is preferably within the above described range.

4. Other Components the first and the second catalysts for exhaust gas purification of the present invention may contain other components in addition to the above described $Al_2O_3$, metal oxide and compounds of catalyst components (precious metals), or $Al_2O_3$, $ZrO_2$, the second metal oxide and compounds of catalyst components (precious metals). Such components are not particularly limited, and examples thereof include alkali metals, alkali earth metals, rare earth elements and manganese, iron, copper, silicon, titanium, zirconium and oxides thereof, beta type, ZSM-5 type and Y type zeolites and compounds obtained by ion exchange of these zeolites with iron, copper, cerium, or the like. In addition, a supported amount of the above described component is not particularly limited. Specifically, a use amount of each component (supported amount; oxide conversion) can be used in an amount of preferably 0.1 to 250 g, more preferably 0.1 to 200 g, and further more preferably 1 to 100 g, per 1 L of a catalyst (three-dimensional structure).

In particular, in the oxidation catalyst for exhaust gas purification of the present invention, a refractory inorganic oxide is preferably further supported on the catalyst (three-dimensional structure) in a direct form. Hereinafter, a refractory inorganic oxide which is supported on the catalyst (three-dimensional structure) in a direct form is referred to as "a refractory inorganic oxide (supported component)". A timing of supporting the refractory inorganic oxide (supported component) is not particularly limited, and after supporting a metal oxide is preferable and after supporting a catalyst component is more preferable. For example, for the refractory inorganic oxide (supported component), any component used as a catalyst carrier may be used, and examples thereof include active alumina such as α-alumina, γ-alumina, δ-alumina, η-alumina and θ-alumina, single oxides such as titania, zirconia and silicon oxide (silica), complex oxides or fine mixtures such as alumina-titania, zirconia-alumina, titania-zirconia, zeolite, silica-titania, silica-zirconia, silica-alumina, and lanthanum-alumina, and mixtures of these compounds. Among them, preferably used are single oxides such as zeolite, γ-alumina, silica, titania, zirconia and ceria, complex oxides or fine mixtures such as silica-alumina, lanthanum-alumina, zirconia-alumina and ceria-zirconia, and mixtures of these compounds. Zeolite is more preferable, and β-zeolite is further more preferable. Zeolite is an adsorbent of hydrocarbon and can adsorb heavy hydrocarbon (HC) that is adsorbed at a low temperature before the catalyst is activated. In this time, when β-zeolite is used, a molar ratio of silica and alumina (silica/alumina ratio) is not particularly limited, preferably 15 to 500, more preferably 20 to 250, and further more preferably 25 to 200 is used. The above described refractory inorganic oxide may be used solely or in a form of a mixture of two or more kinds.

A form of the refractory inorganic oxide (supported component) is not particularly limited and the following form is preferable. For example, a BET (Brunauer-Emmett-Teller) specific surface area of the refractory inorganic oxide (supported component) is not particularly limited and is preferably large. The BET specific surface area is preferably 100 to 650 $m^2/g$, more preferably 150 to 600 $m^2/g$, and further more preferably 200 to 550 $m^2/g$. The average particle diameter of the refractory inorganic oxide powder is also not particularly limited and, is preferably 0.1 to 10 μm, more preferably 0.2 to 5 μm, and further more preferably 0.3 to 3 μm, in consideration of uniformity of a slurry.

When the refractory inorganic oxide (supported component) is contained, a use amount (supported amount) of the refractory inorganic oxide (supported component) preferably 1 to 250 g, more preferably 10 to 150 g, and further more preferably 15 to 100 g, per 1 L of the catalyst (for example, three-dimensional structure). When the refractory inorganic oxide (supported component) is contained within the range, performance and a cost are appropriate as an adsorbent of heavy hydrocarbon. In addition, a supported amount of the refractory inorganic oxide (supported component) does not include a supported amount of the first or the second oxide mixture as the above described carrier, and is an amount of a refractory inorganic oxide that is separately supported on a three-dimensional structure.

<Method for Producing Catalyst for Exhaust Gas Purification>

A production method of the catalyst for exhaust gas purification of the present invention is not particularly limited and, for example, the following example is included.

A production method of the catalyst for exhaust gas purification of the present invention includes a step of adding a solution containing a water-soluble compound of Al and a water-soluble compound of one or more metals selected from the group consisting of Zr, Ce, Y, Nd, Si and Ti to an alkaline solution to be mixed and coprecipitating to obtain a coprecipitated product, and then calcining the coprecipitated product to thus obtain a carrier containing the above described aluminum oxide and metal oxide.

The production method of the catalyst for exhaust gas purification of the present invention may further include a step of impregnating the carrier containing $Al_2O_3$ and the metal oxide with an aqueous solution of a compound of a catalyst component, then calcining the carrier obtained by impregnation to obtain a catalyst component-supported carrier.

The production method of the catalyst for exhaust gas purification of the present invention may also include a step of preparing a slurry containing the catalyst component-supported carrier, or the catalyst component-supported carrier and a refractory inorganic oxide (supported component) (preferably zeolite), and coating the slurry to a three-dimensional structure.

1. Production Method of the First or Second Oxide Mixture

Firstly, the production method of the oxide mixture of the present invention will be described.

A preferable production method of the oxide mixture in the present invention is an embodiment in which the production method includes a step of adding a solution containing a water-soluble compound of Al and a water-soluble compound of one or more metals selected from the group consisting of Zr, Ce, Y, Nd, Si and Ti to an alkaline solution to be mixed and after coprecipitating to obtain a coprecipitated product (that is, after coprecipitating a precursor of the oxide mixture), and calcine the coprecipitated product (precursor) to thus obtain an oxide mixture (a carrier containing the aluminum oxide and the metal oxide).

The first oxide mixture of the present invention may contain $Al_2O_3$, and one or more metal oxides selected from the group consisting of zirconium oxide ($ZrO_2$), cerium oxide ($CeO_2$), yttrium oxide ($Y_2O_3$), neodymium oxide ($Nd_2O_3$), silicon oxide ($SiO_2$) and titanium oxide ($TiO_2$). A production method is not particularly limited and includes a zol-gel method, a method of mixing sols, a mechanical milling method, and the like. However, in order to form a mixture obtained by mixing primary particles in nano order as described above, the oxide mixture is preferably produced in a coprecipitation method.

That is, the oxide mixture of the present invention is obtained by adding a solution containing a water-soluble compound of Al and a water-soluble compound of one or more metals selected from the group consisting of Zr, Ce, Y, Nd, Si and Ti (for example, a water soluble compound of Zr when the metal oxide is $ZrO_2$) to an alkaline solution to be mixed and depositing (coprecipitating) a coprecipitated product, which is a precipitate made of an $Al_2O_3$ precursor and a metal oxide precursor (precursors of the oxide mixture) (coprecipitation step).

The second oxide mixture of the present invention may contain $Al_2O_3$, $ZrO_2$, and one or more metal oxides selected from the group consisting of $SiO_2$ and $TiO_2$. For production, Al, Zr, Ti and Si may be simultaneously coprecipitated in a coprecipitation method, or Al and Zr may be deposited in the coprecipitation method, thereafter impregnating with an aqueous solution of a water-soluble compound of Ti and/or Si. However, in order to allow Ti and/or Si to exist in fine particles or an amorphous form, it is preferably produced simultaneously in the coprecipitation method.

That is, the second oxide mixture of the present invention is obtained by adding a solution containing a water-soluble compound of Al and a water-soluble compound of Zr, or a solution containing a water-soluble compound of Al, a water-soluble compound of Zr and a water-soluble compound of Ti (hereinafter may also be referred to simply as "a salt solution") to an alkaline solution or an alkaline solution containing a water-soluble compound of Si to be mixed and depositing (coprecipitating) to obtain a coprecipitated product, which is a precipitate made of an $Al_2O_3$ precursor, a $ZrO_2$ precursor and a metal oxide precursor (precursor of the oxide mixture) (coprecipitation step).

In addition, a water-soluble compound of Si (such as sodium metasilicate) does not stably exist in an acidic solution, but stably exists in an alkaline solution. Therefore, when a water-soluble compound of Si is used, it is preferable that the water-soluble compound of Si is dissolved in an alkaline solution before adding a salt solution to the alkaline solution, or a salt solution of Al and Zr or a salt solution of Al, Zr and Ti is added to an alkaline solution to be mixed and the water-soluble compound of Si is then added.

For a water-soluble compound of Al (salt of Al), aluminum sulfate (sulfate), aluminum nitrate (nitrate), aluminum hydrochloride (hydrochloride), aluminum acetate (acetate), and the like can be used, and aluminum nitrate is preferable. Furthermore, for example, as materials of aluminum nitrate, aluminum hydroxide, nitric acid, and water may be mixed to be used. In addition, the above described water-soluble compounds of Al may be used solely or a mixture of two or more of them may be used in the present invention.

Examples of the water-soluble compounds of metals selected from the group consisting of Zr, Ce, Y, Nd, Si and Ti (salts of metals), which can be used, include salts of Zr such as zirconyl sulfate (sulfate), zirconyl nitrate (nitrate), zirconyl hydrochloride (hydrochloride), zirconyl acetate (acetate), zirconyl carbonate (carbonate), zirconyl chloride (chloride), and zirconyl hydroxide (hydroxide); salts of Ce such as cerium sulfate (sulfate), cerium nitrate (nitrate), cerium hydrochloride (hydrochloride), cerium acetate (acetate), cerium carbonate (carbonate), cerium chloride (chloride), and cerium hydroxide (hydroxide); salts of Y such as yttrium sulfate (sulfate), yttrium nitrate (nitrate), yttrium hydrochloride (hydrochloride), yttrium acetate (acetate), yttrium carbonate (carbonate), yttrium chloride (chloride), and yttrium hydroxide (hydroxide); salts of Nd such as neodymium sulfate (sulfate), neodymium nitrate (nitrate), neodymium hydrochloride (hydrochloride), neodymium acetate (acetate), neodymium carbonate (carbonate), neodymium chloride (chloride), and neodymium hydroxide (hydroxide); silicates (salts of Si) such as sodium orthosilicate ($Na_4SiO_4$), potassium orthosilicate ($K_2SiO_4$), sodium metasilicate ($Na_2SiO_3$), potassium methasilicate ($K_2SiO_3$), sodium disilicate ($Na_2Si_2O_5$), potassium disilicate ($K_2Si_2O_5$), sodium tetrasilicate ($Na_2SiO_9$), potassium tetrasilicate ($K_2SiO_9$), sodium sesquisilicate ($3Na_2O.2SiO_2$), and potassium sesquisilicate ($3K_2O.2SiO_2$); and salts of Ti such as titanium sulfate (sulfate), titanium chloride (chloride), and titanium alkoxide. Among these, a water-soluble compound of metal of Zr (salt of metal) is preferably zirconyl nitrate, a water-soluble compound of a metal of Si (salt of metal) is preferably sodium metasilicate, and a water-soluble compound of a metal of Ti (salt of metal) is preferably titanium sulfate. In addition, the above described water-soluble compounds of metals may be used solely or a mixture of two or more may be used in the present invention.

For a solvent of uniformly dissolving the above described water-soluble compound of Al and water-soluble compound of a metal (for example, a water-soluble compound of Zr, a water-soluble compound of Ti), water, an alcohol and a mixture thereof can be used. For the alcohol, ethanol, 1-propanol, or 2-propanol can be used. Concentrations (contents) of the water-soluble compound of Al and the water-soluble compound of a metal in a solvent are not particularly limited and can be suitably set according to amounts to have $Al(Al_2O_3)$ and a metal (metal oxide) support. For example, each of the contents of the water-soluble compound of Al and the water-soluble compound of a metal is preferably 0.01 to 80% by mass.

Then, a solution containing a water-soluble compound of Al and a water-soluble compound of one or more metals selected from the group consisting of Zr, Ce, Y, Nd, Si and Ti (hereinafter may also referred to simply as "a salt solution") is added to an alkaline solution, thereby a precipitate of a precursor of the oxide mixture deposits.

For example, a solution containing a water-soluble compound of Al and a water-soluble compound of Zr, or a solution containing a water-soluble compound of Al, a water-soluble compound of Zr and a water-soluble compound of Ti (salt solution) is added to an alkaline solution or an alkaline solution containing a water-soluble compound of Si, thereby a precipitate of a precursor of the second oxide mixture deposits.

For the alkaline solution, an aqueous solution or an alcohol solution obtained by dissolving ammonium, ammonium carbonate, sodium hydroxide, potassium hydroxide, sodium carbonate, or the like, can be used. Among the alkaline solutions, an aqueous solution or an alcohol solution obtained by dissolving ammonium or ammonium carbonate, which is volatilized in firing, is more preferable. A pH of an alkaline solution is preferably 9 or more because of promoting a deposition reaction of a precursor of each oxide. A precursor of each oxide is hydroxide, carbonate or nitrate of elements other than oxygen, which constitute each oxide. A content of a water-soluble compound of Si in an alkaline solution is preferably 0.01 to 80% by mass.

An alkaline solution is added so as to set to be a pH from 7 to 10 in the coprecipitation step if necessary. The adding amount of the alkaline solution is an amount in a level at which a pH is set to be from 7 to 10. In the coprecipitation step, a pH is preferably 8 to 10, and more preferably 9 to 10. In addition, when a water-soluble compound of Si is used, the pH of the solution is finally adjusted to around neutral (preferably from pH 5 to 8, more preferably from 6 to 8) using nitric acid, or the like, thereby depositing an oxide precursor.

An alkaline solution or an alkaline solution containing a water-soluble compound of Si (hereinafter also referred to simply as "an alkaline solution") is added with the above described salt solution and mixed at a high speed in a short time to form a precursor of an oxide mixture. By mixing fast, gaps among deposition speeds of precursors of respective oxides due to small gaps among pHs in the solution are dissolved. Then, both of a precursor of an easily soluble oxide and a precursor of a hardly soluble oxide deposit at the same time, and thus, a precursor of the oxide mixture in which respective elements are dispersed with a uniform composition can be formed. Mixing is preferably carried out at 5 to 50° C. In addition, an alkaline solution containing a water-soluble compound of Si is used, a salt solution is added and the pH of the solution is then adjusted to around neutral (preferably pH 5 to 8, more preferably 6 to 8) using nitric acid, or the like, to thus deposit an oxide precursor. When a water-soluble compound of Si is added to an alkaline solution, a salt solution is added to an alkaline solution, and the pH of the obtained solution is adjusted to around neutral (preferably pH 5 to 8, more preferably 6 to 8) using nitric acid, or the like, to thus deposit an oxide precursor.

The precursor of the oxide mixture obtained by coprecipitation is taken out from a solution of a precursor and sufficiently washed, and then dried at 50 to 250° C., preferably 70 to 200° C., more preferably 80 to 150° C., for 10 minutes to 20 hours, preferably for 3 to 15 hours, and the obtained product is further fired in the atmosphere, at 100 to 1200° C., preferably 200 to 1100° C., more preferably 300 to 1000° C., for 10 minutes to 20 hours, preferably for 3 to 15 hours, to thus obtain an oxide mixture. Firing may be carried out in an inert gas flow such as nitrogen gas before firing in the atmosphere.

As described above, the precursor (a water-soluble compound of Al and a water-soluble compound of a metal) are coprecipitated and the coprecipitated product is fired, thereby obtaining the oxide mixture of $Al_2O_3$ and metal oxide. The method can be used since the metal oxide hardly forms a solid solution with $Al_2O_3$.

In addition, as the oxide mixture obtained as described above, various oxide mixtures such as mixtures of two compounds such as $Al_2O_3/ZrO_2$, $Al_2O_3/CeO_2$, $Al_2O_3/Y_2O_3$, $Al_2O_3/Nd_2O_3$, $Al_2O_3/SiO_2$ and $Al_2O_3/TiO_2$, mixtures of three compounds such as $Al_2O_3/ZrO_2/CeO_2$, $Al_2O_3/ZrO_2/Y_2O_3$, $Al_2O_3/ZrO_2/Nd_2O_3$, $Al_2O_3/ZrO_2/SiO_2$ and $Al_2O_3/ZrO_2/TiO_2$, and mixtures of four compounds such as $Al_2O_3/ZrO_2/SiO_2/TiO_2$ are considered to exist.

The oxide mixture can be used as a carrier to support a catalyst component in the present invention.

2. Production Method of Catalyst for Exhaust Gas Purification

Next, the catalyst for exhaust gas purification of the present invention is prepared using the oxide mixture obtained as described above.

A preferable production method of the catalyst for exhaust gas purification in the present invention includes a step of impregnating a carrier containing $Al_2O_3$ and metal oxide with an aqueous solution of a compound of a catalyst component, thereafter firing the carrier obtained by impregnating to thus obtain a catalyst component-supported carrier.

A preferable production method of the catalyst for exhaust gas purification in the present invention further includes a step of preparing a slurry containing a catalyst component-supported carrier, or a catalyst component-supported carrier and a fire-resistant inorganic oxide (supported component) (preferably zeolite), and coating the slurry onto a three-dimensional structure.

That is, in one embodiment of the present invention, one or more catalyst components (precious metals) selected from the group consisting of Au, Ag, Pt, Pd, Rh, Ir, Ru and Os are supported on the oxide mixture to thus obtain the catalyst for exhaust gas purification of the present invention.

Furthermore, as another embodiment, a carrier on which a catalyst component is supported (a catalyst component-supported carrier) and a fire-resistant inorganic oxide (supported component) (preferably zeolite) can be supported on the catalyst for exhaust gas purification of the present invention. Furthermore, at least one or more alkali metals, alkali earth metals, and rare earth elements can be supported on the catalyst for exhaust gas purification of the present invention.

The following methods are exemplified as the production method of a catalyst for exhaust gas purification.

(1) A method in which an oxide mixture (carrier) is added to an aqueous solution of a compound (raw material) of a catalyst component (precious metal) and sufficiently mixed, thereafter drying and firing, as desired, to thus obtain powder of a catalyst component-supported carrier (the oxide mixture). The powder is formed into an aqueous slurry and the aqueous slurry is coated on a three-dimensional structure and then dried and fired, as desired, to thus prepare a complete catalyst.

(1') A method in which an oxide mixture (carrier) is added to an aqueous solution of a compound (raw material) of a catalyst component (precious metal) and sufficiently mixed, thereafter drying and firing, as desired, to thus obtain powder of a catalyst component-supported carrier (the oxide mixture). A fire-resistant inorganic oxide (supported component) is further mixed in the powder of the catalyst component-supported carrier, and the mixture was wet pulverized to form an aqueous slurry, the aqueous slurry is coated on a three-dimensional structure and then dried and fired, as desired, to thus prepare a complete catalyst.

(2) A method in which a compound (raw material) of a catalyst component (precious metal) and an oxide mixture are put together to form an aqueous slurry, and the aqueous slurry is coated on a three-dimensional structure and then dried and fired, as desired, to thus prepare a complete catalyst.

(2') A method in which a compound (raw material) of a catalyst component (precious metal) and an oxide mixture are put together and a fire-resistant inorganic oxide (supported component) is further mixed therein, as desired to form an aqueous slurry, and the aqueous slurry is coated on a three-dimensional structure and then dried and fired, as necessary, to thus prepare a complete catalyst.

(3) A method in which a compound (raw material) of a catalyst component (precious metal) and an oxide mixture are put together to form an aqueous slurry, and the aqueous slurry is coated on a three-dimensional structure and then dried and fired, as desired, and the three-dimensional structure is further immersed in an aqueous solution of a compound (raw material) of a component such as an alkali metal and dried and fired, as desired, to thus prepare a complete catalyst.

(3') A method in which a compound (raw material) of a catalyst component (precious metal) and an oxide mixture are put together and a fire-resistant inorganic oxide (supported component) is mixed therein, as desired, to form an aqueous slurry, the aqueous slurry is coated on a three-dimensional structure and then dried and fired, as necessary, and the three-dimensional structure is further immersed in an aqueous solution of a compound (raw material) of a component such as an alkali metal and then dried and fired, if necessary, to thus prepare a complete catalyst.

(4) A method in which an oxide mixture (carrier) is added to an aqueous solution of a compound (raw material) of a component such as an alkali metal and sufficiently mixed, thereafter drying and firing, as desired, to thus obtain powder of an alkali metal-supported carrier (oxide mixture). The powder is formed into an aqueous slurry and the aqueous slurry is coated on a three-dimensional structure and then dried and fired, as desired, and the three-dimensional structure is further immersed in an aqueous solution of a compound (raw material) of a catalyst component and then dried and fired, as desired, to thus prepare a complete catalyst.

(4') A method in which an oxide mixture (carrier) is added to an aqueous solution of a compound (raw material) of a component such as an alkali metal and sufficiently mixed and a fire-resistant inorganic oxide (supported component) is further mixed therein, as desired, thereafter drying and firing, as desired, to thus obtain powder of a an alkali metal-supported carrier (oxide mixture). The powder is formed into an aqueous slurry and the aqueous slurry is coated on a three-dimensional structure and then dried and fired, as desired, and the three-dimensional structure is further immersed in an aqueous solution of a compound (raw material) of a catalyst component and then dried and fired, as desired, to thus prepare a complete catalyst.

(5) A method in which a compound (raw material) of a catalyst component (precious metal), an oxide mixture and a compound (raw material) of a component such as an alkali metal are put together and a fire-resistant inorganic oxide (supported component) is further mixed therein, as desired, to form an aqueous slurry and the aqueous slurry is coated on a three-dimensional structure and then dried and fired, as desired, to thus prepare a complete catalyst.

In the above described supporting methods in the present invention, the catalyst is preferably produced by the method (1) in which powder of a catalyst component-supported carrier (oxide mixture) is firstly obtained, the powder is then formed into an aqueous slurry, and the aqueous slurry is coated on a three-dimensional structure and then dried and fired to thus prepare a complete catalyst, or the method (1') in which powder of a catalyst component-supported carrier (oxide mixture) is firstly obtained, the powder is then formed into an aqueous slurry, a fire-resistant inorganic oxide (supported component) is further mixed therein, and the aqueous slurry is coated on a three-dimensional structure and then dried and fired to thus prepare a complete catalyst. The methods (1) and (1') will be described below.

A catalyst component used in the present invention and a compound (raw material) of a catalyst component used in the above described production methods are not particularly limited, a catalyst component may be added in a direct form or in another form and then converted into a desired form (a form of a precious metal). In the present invention, a catalyst component is preferably added in another from, in particular, a water-soluble precious metal salt (a water-soluble compound of a precious metal), that is, a form of a salt solution containing a precious metal, in order to add a compound of a catalyst component to an aqueous medium. Herein, the water-soluble precious metal salt is not particularly limited, and materials used in the field of exhaust gas purification can be used. Specifically, examples in the case of palladium include palladium; halides such as palladium chloride; inorganic salts such as nitrate and sulfate of palladium; carboxylates such as acetate of palladium; and hydroxides of palladium, halides; inorganic salts; carboxylates; and hydroxides of tetraammine palladium and hexammine palladium, alkoxides, dinitrodiammine palladium, and oxides. Preferable examples include nitrate, and nitrates; carboxylates; and hydroxides of dinitrodiammine palladium, tetraammine palladium and hexammine palladium, and more preferable examples include nitrate (palladium nitrate), and nitrates; carboxylates; and hydroxides of tetraammine palladium and hexammine palladium. Examples in the case of platinum include platinum; halides such as platinum bromide and platinum chloride; inorganic salts such as a hexahydroxo acid salt and a tetranitro acid salt of platinum; carboxylates such as acetate of platinum; and hydroxides of platinum, halides; inorganic salts; carboxylates; and hydroxides of tetraammine platinum and hexammine platinum; alkoxides, dinitrodiammine platinum, and oxides. Preferable examples include nitrates, carboxylates, hydroxides, and hexahydroxo acid salts of dinitrodiammine platinum, tetraammine platinum, and hexammine platinum, and more referable examples include nitrates, carboxylates, hydroxides, and hexahydroxo acid salts of dinitrodiammine platinum, tetraammine platinum, and hexammine platinum. Examples in the case of rhodium include rhodium; halides such as rhodium chloride; inorganic salts such as nitrates, sulfates, hexammine salts, and hexacyano acid salts of rhodium; carboxylates such as acetate of rhodium; and hydroxide of rhodium, alkoxides, and oxides. Preferable examples include nitrates and hexammine salts, and more preferable examples include nitrate (rhodium nitrate). The above described compounds of precious metals (precious metal sources) in the present invention may be used solely or in a mixture of two or more compounds. In the case of mixing, the same kinds of compounds are preferably used.

A use amount (supported amount) of a compound of a catalyst component is not particularly limited, and can be suitably selected according to a concentration of a toxic component to be purified (removed). Specifically, it is such a use amount (supported amount; precious metal conversion) of the above described catalyst component.

For an aqueous solution that uniformly dissolves the above described compound of the catalyst component (water-soluble precious metal salt), water and a mixture of water and alcohol can be used. For the alcohol, ethanol, 1-propanol, or 2-propanol can be used. A concentration (content) of the water-soluble metal salt in an aqueous solution is not particularly limited and can be suitably selected according to an amount of supporting the catalyst component. For example, a content of a water-soluble precious metal salt in an aqueous solution is preferably 0.01 to 80% by mass.

A method in which a catalyst component is supported on the oxide mixture (carrier) is not particularly limited as long as the method is performed under the condition of sufficiently uniformly bringing the catalyst component in an aqueous solution into contact with the oxide mixture and, in the next step of drying and fired, sufficiently supporting the catalyst component on the oxide mixture. The oxide mixture (carrier) is added to the aqueous solution of the above described water-soluble precious metal salt and sufficiently mixed, then dried at 50 to 250° C., preferably 70 to 200° C., more preferably 80 to 150° C., for 10 minutes to 20 hours, preferably 3 to 15 hours, and the obtained product is further fired in the atmosphere at 100 to 1200° C., preferably 200 to 1100° C., more preferably 300 to 1000° C., for 10 minutes to 20 hours, preferably for 1 to 15 hours to thus obtain powder of a catalyst component-supported carrier (oxide mixture). In addition, firing may be carried out in an inert gas flow such as nitrogen gas before firing in the atmosphere.

In a preferable embodiment in the present invention, a catalyst component-supported oxide mixture (catalyst component-supported carrier) is supported on a three-dimensional structure.

In a preferable embodiment in the present invention, a catalyst component-supported carrier (oxide mixture) which supports the catalyst component and a fire-resistant inorganic oxide (supported component) are supported on a three-dimensional structure.

A method of supporting the catalyst component-supported carrier obtained in the above method or the catalyst component-supported carrier and fire-resistant inorganic oxide (supported component) on a three-dimensional structure is not particularly limited, and it is preferable that an aqueous slurry containing these components are prepared and the aqueous slurry is then coated (supported) on a three-dimensional structure.

A method of preparing the aqueous slurry is not particularly limited and is prepared in, for example, wet pulverization. Wet pulverization is generally carried out in a known method, not particularly limited, and a ball mill is preferably used. Alternatively, conventionally known techniques such as an attritor, a homogenizer, an ultrasonic disperser, a sand mill, a jet mill, and a bead mill can be used. Herein, wet pulverization conditions are not particularly limited. For example, a temperature in wet pulverization is usually at 5 to 40° C., preferably around at room temperature (25° C.). In addition, a wet pulverization time is generally from 10 minutes to 20 hours. Note that the wet pulverization time differs depending on a wet pulverization equipment to be used, and for example, when equipment having high pulverization efficiency, such as an attritor, is used, the wet pulverization time is about 10 to 60 minutes, and when a ball mill is used, the wet pulverization time is about 5 to 20 hours. In addition, as a solvent used in wet pulverization, water, alcohols such as ethanol, 1-propanol and 2-propanol can be used, and water is particularly preferable. Concentrations (contents) of supported components (for example, a catalyst component-supported carrier (oxide mixture) and a fire-resistant inorganic oxide (supported component)) in a solvent in wet pulverization are not particularly limited and can be suitably selected according to amounts of carrying the catalyst component-supported carrier (oxide mixture) and the fire-resistant inorganic oxide (supported component). For example, a total amount of contents of a catalyst component-supported carrier (oxide mixture) and a fire-resistant inorganic oxide (supported component) in a solution is preferably 0.1 to 80% by mass.

A method of supporting (coating) an aqueous slurry obtained in the above described method on a three-dimensional structure is not particularly limited and the aqueous slurry is preferably supported on the three-dimensional structure by wash coating. Wash coating is generally carried out in a known method and is not particularly limited, and wash coating conditions are also not particularly limited. For example, a three-dimensional structure is immersed in the aqueous slurry, an excessive slurry is removed and fired, thereby producing an exhaust gas purification oxidizing catalyst in which a catalyst component-supported carrier (oxide mixture), or a catalyst component-supported carrier (oxide mixture) and a fire-resistant inorganic oxide (supported component) are supported on a three-dimensional structure. A condition in wash coating an aqueous slurry on a three-dimensional structure is not particularly limited, as long as it is a condition of sufficiently uniformly bringing supported components in an aqueous slurry, for example, a catalyst component-supported carrier (oxide mixture) and a fire-resistant inorganic oxide (supported component) into contact with a three-dimensional structure and sufficiently supporting these components on the three-dimensional structure in the next drying and firing steps.

In such a method, the fire-resistant inorganic oxide (supported component) supported on a three-dimensional structure may be any inorganic oxide as long as it is generally used as a catalyst for internal combustions without particular limitation, and as described above, zeolite that is an adsorbent of hydrocarbon is preferable. For the fire-resistant inorganic oxide (supported component), those obtained in known methods are used and commercially available ones can be used, and specifically, the above described fire-resistant inorganic oxide is added in a direct form. A use amount (supported amount) of a fire-resistant inorganic oxide (supported component) is not particularly limited and can be suitably selected according to a concentration of a toxic component to be purified (removed). Specifically, the use amount is to be the above described amount of a fire-resistant inorganic oxide (supported component).

Then, a three-dimensional structure coated with a catalyst component-supported carrier (oxide mixture), or a catalyst component-supported carrier (oxide mixture) and a fire-resistant inorganic oxide (supported component) is dried at 50 to 250° C., preferably at 70 to 200° C., more preferably at 80 to 180° C., for 1 minute to 20 hours, preferably for 5 minutes to 15 hours, and the obtained product is further fired at 100 to 1200° C., preferably at 200 to 1100° C., more preferably at 300 to 1000° C., for 10 minutes to 20 hours, preferably for 30 minutes to 15 hours in the atmosphere to thus obtain the catalyst for exhaust gas purification of the present invention.

In the present invention, a three-dimensional structure is preferably treated with a reducing gas (for example, under an air flow of 5% of hydrogen and 95% of nitrogen) according to necessity, after the above described drying step or firing step. Herein, hydrogen gas, carbon monoxide gas, or the like can be used as a reducing gas, and hydrogen gas is preferable. For the reducing gas, one of the above described gases may be used solely, two of more gases described above may be used in mixing, or one or two gases described above may be used in mixing with other gases. Use of the above described gases with other gases in mixing is preferable and use of hydrogen gas by diluting with nitrogen gas is more preferable. An adding amount of a reducing gas in this case is not particularly limited as long as it is an amount capable of treating a dried three-dimensional structure in a desired level, an atmosphere of treating a three-dimensional structure preferably contains 1 to 10% by volume of a reducing gas, more preferably contains 3 to 5% by volume of a reducing gas. In addition, a condition of treating a dried three-dimensional structure with a reducing gas is not particularly limited. For example, a dried three-dimensional structure is preferably treated at 150 to 600° C. for 1 to 10 hours while the above described reducing gas is flown at 10 to 100 ml/minute.

Herein, the three-dimensional structure is not particularly limited, and similar ones generally used for preparation of a catalyst for exhaust gas purification can be used. Examples thereof include fire-resistant carriers such as a honeycomb carrier, an integral honeycomb structure (honeycomb carrier) is preferable and, for example, a monolith honeycomb carrier, a plug honeycomb carrier, and the like are included.

As a monolith carrier, generally, materials called ceramic honeycomb carriers may be used, in particular, honeycomb carriers which contain silicon carbide (SiC), cordierite, mullite, petalite, alumina (α-alumina), silica, zirconia, titania, titanium phosphate, aluminum titanate, spodumene, aluminosilicate, magnesium silicate, zeolite, silica, and the like, as materials are preferable, and among them, a honeycomb carrier made of cordierite is particularly preferable. Other than the above, honeycomb carriers obtained by forming an integral structure using heat-resistant metals with oxidization resistance such as stainless steel and Fe—Cr—Al alloy, so-called metal honeycomb carriers, are also used. A three-dimensional structure may be used in any type such as a flow-through type (open flow type) in which a gas can directly pass through, a filter type capable of filtering soot in an exhaust gas, or a plug type. In addition, being not a three-dimensional integral structure, a pellet carrier, and the like can be exemplified. Herein, the plug type honeycomb means a honeycomb having a large number of permeable pores and having open pores and close pores in a checkered pattern on the introduction surface of a gas, in which when one permeable pore is an open pore, the other side of the same permeable pore is a close pore. The plug honeycomb carrier has fine pores on walls between respective pores, and an exhaust gas enters from open pores to the honeycomb and passes other pores through the fine pores to come outside the honeycomb.

These honeycomb carriers are produced in an extrusion molding method, a method of solidly winding a sheet-form element, or the like. A shape of a gas vent (cell form) may be any of hexagon, square, triangle, and a corrugation form. The cell density (the number of cells/unit cross sectional area) of 100 to 1200 cell/square inch is sufficiently usable, preferably 200 to 900 cell/square inch, and more preferably 300 to 600 cell/square inch.

The catalyst for exhaust gas purification of the present invention may contain other components in addition to an oxide mixture and a catalyst component as described in the methods (3) to (5). Such components are not particularly limited, and examples thereof include alkali metals, alkali earth metals, rare earth elements and manganese, and oxides of these substances, beta type, ZSM-5 type and Y type zeolites, and ion exchanged substances thereof with iron, copper and cerium (hereinafter may also be referred to as "components such as alkali metals" or simply as "components"). Examples of alkali metals used herein include sodium, potassium, rubidium, and cesium. In the same manner, examples of alkali earth metals used herein include strontium and barium. Examples of rare earth elements used herein include cerium, lanthanum, praseodymium, neodymium, samarium, europium, gadolinium, terbium, dysprosium, holmium, and erbium. Components such as the above described alkali metals may be added in a direct metal form or an oxide form. In addition, the above described components may be added in a direct form, or added in other forms and then converted into a desired form (for example, a form of an alkali metal). A component such as an alkali metal is preferably added in another form, in particular, a form of a water-soluble compound in the present invention. Herein, the water-soluble compound is not particularly limited and materials used in the field of exhaust gas purification can be used. Note that components such as alkali metals described above may be used solely or a mixture of two or more of them may be used in the present invention.

When the catalyst for exhaust gas purification of the present invention contains other components, a method of adding or supporting a compound (raw material) of a component such as an alkali metal in a final stage of a complete catalyst is preferable in consideration of a viscosity and convenience of handling of a preparation liquid during preparation of the catalyst.

As described above, the catalyst for exhaust gas purification of the present invention has high durability and is excellent in purification performance on nitrogen oxide (NOx), carbon monoxide (CO), and hydrocarbon (HC) that is an unburned component of fuel such as gasoline or fuel of a diesel engine such as light oil and heavy oil, in particular, carbon monoxide (CO) and hydrocarbon (HC), in an exhaust gas at a low temperature.

Therefore, for the exhaust gas purification performance of the catalyst for exhaust gas purification of the present invention on carbon monoxide (CO), a temperature showing a 50% CO conversion rate is not particularly limited and is preferably 200° C. or less, more preferably 195° C. or less, further more preferably 190° C., and particularly preferably 180° C. or less. Note that a lower limit of the 50% CO conversion rate is more preferable, but in order to constantly keep the catalytic performance, it is preferably 140° C. or more. For the exhaust gas purification performance on hydrocarbon (HC), a temperature showing a 50% HC conversion rate is not particularly limited and is preferably 200° C. or less, more preferably 195° C. or less, further more preferably 190° C., and particularly preferably 180° C. or less. Note that a lower limit of the 50% HC conversion rate is more preferable, but in order to constantly keep the catalytic performance, it is preferably 140° C. or more. Note that measurements of the above described 50% CO conversion rate and 50% HC conversion rate are followed by methods in examples described later.

Therefore, a catalyst for exhaust gas purification that is produced by the method of the present invention can be favorably used for purification of an exhaust gas (in particular, HC and CO) of internal combustions. The catalyst according to the present invention can be favorably used for processing an exhaust gas containing a reducing gas in the exhaust gas of internal combustions and has an excellent effect on purification of hydrocarbon (HC) and carbon monoxide (CO) contained in the exhaust gas with a high reducing property from internal combustions such as particularly gasoline engine and diesel engine in acceleration, and the like.

As described above, the second catalyst for exhaust gas purification of the present invention has high durability, and excellent in purification performance on nitrogen oxide (NOx), carbon monoxide (CO), and hydrocarbon (HC) that is an unburned component of fuel such as gasoline or fuel of a diesel engine such as light oil and heavy oil, in particular, carbon monoxide (CO), in an exhaust gas at a low temperature (for example, 160° C. or less).

The second catalyst for exhaust gas purification of the present invention improves heat resistance of catalytic performance and can impart an effect of protecting the catalytic performance from poisoning due to a sulfur component in a fuel.

Therefore, the present invention also provides an exhaust gas purification method including bringing an exhaust gas into contact with the catalyst for exhaust gas purification according to the present invention.

A composition of an exhaust gas is not particularly limited, and the catalyst of the present invention is excellent in decomposition activity of carbon monoxide (CO) discharged from a boiler, an incinerator, diesel engine and various industrial processes, and therefore favorably used in processing of an exhaust gas containing such carbon monoxide (CO). In addition, the second catalyst of the present invention suppresses reduction in catalytic performance even when sulfur poisoning is given, and is thus favorably used in processing of exhaust gas containing sulfur oxide (SOx), in particular, $SO_2$.

The catalyst of the present invention is used for purification of an exhaust gas from internal combustions such as gasoline engine and diesel engine, in particular, diesel engine, and an exhaust gas and a catalyst during purification are brought into contact at a spatial velocity of preferably 1,000 to 500,000 $hr^{-1}$, more preferably 5,000 to 150,000 $hr^{-1}$, at a gas linear velocity of preferably 0.1 to 8.5 m/sec, more preferably 0.2 to 4.2 m/sec.

The catalyst of the present invention is used for purification of an exhaust gas from internal combustions such as gasoline engine and diesel engine, in particular, diesel engine, and can favorably oxidize CO when CO in an exhaust gas is contained in an amount of, for example, preferably 10 to 50,000 vol ppm, more preferably 50 to 15,000 vol ppm, further more preferably 50 to 5,000 vol ppm in a lean atmosphere. Furthermore, the catalyst can favorably oxidize HC when HC in an exhaust gas is contained in an amount of, for example, preferably 10 to 50,000 vol ppm (carbon (C1) conversion), more preferably 10 to 10,000 vol ppm, further more preferably 10 to 5,000 vol ppm in a lean atmosphere.

In addition, similar or different catalysts for exhaust gas purification may be arranged in a front step (inflow side) or a rear step (outflow side) of the catalyst according to the present invention.

EXAMPLES

Hereinbelow, the present invention will be described in further detail with reference to examples; however, the present invention is not limited only to these examples obviously and can be carried out with addition of suitable changes within the range capable of conforming to the purposes described previously or later, and all of the changes are included in the technical range of the present invention. In addition, unless otherwise noted, "%" and "ppm" are based on mass in the following production examples.

Example 1-1

1442.22 g of aluminum nitrate nonahydrate ($Al(NO_3)_3 \cdot 9H_2O$) was completely dissolved in 0.95 L of deionized water, thereto was further added 20.0 g of an aqueous zirconyl nitrate solution (concentration of 20% by mass in $ZrO_2$ conversion), and the mixture was stirred well to prepare an aqueous mixed solution. This solution was dropped to 2 L of an aqueous solution that was obtained by adjusting to pH 9 with ammonia. During dropping, the solution was adjusted to a pH within the range from 7 to 10 with ammonia water at a temperature of 25° C. A precipitate was generated, filtered, washed well with deionized water, then dried at 120° C. for 8 hours, and calcined at 400° C. for 5 hours and at 700° C. for 5 hours to thus obtain zirconia-alumina A (2% by mass of zirconia, 98% by mass of alumina).

Then, 60 g of the zirconia-alumina A was impregnated with 42.22 g of an aqueous mixed solution obtained by diluting an aqueous dinitrodiammine platinum solution containing platinum in an amount that corresponds to 0.887 g and a palladium nitrate solution containing palladium in an amount that corresponds to 0.443 g with deionized water, the zirconia-alumina A was then dried at 120° C. for 8 hours to obtain powder, and the powder was further calcined at 500° C. for 1 hour to obtain precious metal-supported zirconia-alumina A. 61.33 g of this precious metal-supported zirconia-alumina A and 90 mL of deionized water were mixed and wet milled to form a slurry. 0.0303 L of a cordierite substrate (trade name "Celcor" manufactured by Corning Incorporated, the number of cells: 400 cell/square inch of cross-sectional area), which was cut out into a column shape with a diameter of 24 mm and a length of 67 mm, was dipped in this slurry, wash coated and dried at 150° C. for 5 minutes, and then air calcined at 500° C. for 1 hour, and treated under a stream with 5% hydrogen and 95% nitrogen at 500° C. for 3 hours to thus obtain a catalyst 1-a coated with a catalyst component in an amount of 61.33 g (0.887 g of platinum, 0.443 g of palladium, 60.0 g of zirconia-alumina A) per 1 L-volume of the substrate.

Example 1-2

1397.7 g of aluminum nitrate nonahydrate ($Al(NO_3)_3 \cdot 9H_2O$) was completely dissolved in 0.91 L of deionized water, thereto was further added 50.0 g of an aqueous zirconyl nitrate solution (concentration of 20% by mass in $ZrO_2$ conversion), and the mixture was stirred well to prepare an aqueous mixed solution. This solution was dropped to 2 L of an aqueous solution that was obtained by adjusting to pH 9 with ammonia. During dropping, the solution was adjusted to a pH within the range from 7 to 10 with ammonia water at a temperature of 25° C. A precipitate was generated, filtered, washed well with deionized water, then dried at 120° C. for 8 hours, and calcined at 400° C. for 5 hours and at 700° C. for 5 hours to thus obtain zirconia-alumina B (5% by mass of zirconia, 95% by mass of alumina).

Then, 60 g of the zirconia-alumina B was impregnated with 42.22 g of an aqueous mixed solution obtained by diluting 7.86 g of an aqueous dinitrodiammine platinum solution containing platinum in an amount that corresponds to 0.887 g and 3.16 g of a palladium nitrate solution containing palladium in an amount that corresponds to 0.443 g with deionized water, the zirconia-alumina B was then dried at 120° C. for 8 hours to obtain powder, and the powder was further calcined at 500° C. for 1 hour to obtain precious metal-supported zirconia-alumina B. 61.33 g of this precious metal-supported zirconia-alumina B and 90 mL of deionized water were mixed and wet milled to form a slurry. 0.0303 L of a cordierite substrate (trade name "Celcor" manufactured by Corning Incorporated, the number of cells: 400 cell/square inch of cross-sectional area), which was cut out into a column shape with a diameter of 24 mm and a length of 67 mm, was immersed in this slurry, wash coated and dried at 150° C. for 5 minutes, then air calcined at 500° C. for 1 hour, and further treated at 500° C. for 3 hours under a stream with 5% hydrogen and 95% nitrogen to thus obtain a catalyst 1-b coated with a catalyst component in an amount of 61.33 g (0.887 g of platinum, 0.443 g of palladium, 60.0 g of zirconia-alumina B) per 1 L-volume of the substrate.

Example 1-3

1324.3 g of aluminum nitrate nonahydrate ($Al(NO_3)_3 \cdot 9H_2O$) was completely dissolved in 0.82 L of deionized water, thereto was further added 100.0 g of an aqueous zirconyl nitrate solution (concentration of 20% by mass in $ZrO_2$ conversion), and the mixture was stirred well to prepare an aqueous mixed solution. This solution was dropped to 2 L of an aqueous solution that was obtained by adjusting to pH 9 with ammonia. During dropping, the solution was adjusted to a pH within the range from 7 to 10 with ammonia water at a temperature of 25° C. A precipitate was generated, filtered, washed well with deionized water, then dried at 120° C. for 8 hours, and calcined at 400° C. for 5 hours and at 700° C. for 5 hours to thus obtain zirconia-alumina C (10% by mass of zirconia, 90% by mass of alumina).

Then, 60 g of the zirconia-alumina C was impregnated with 42.22 g of an aqueous mixed solution obtained by diluting 7.86 g of an aqueous dinitrodiammine platinum solution containing platinum in an amount that corresponds to 0.887 g and 3.16 g of a palladium nitrate solution containing palladium in an amount that corresponds to 0.443 g with deionized water, the zirconia-alumina C was then dried at 120° C. for 8 hours to obtain powder, and the powder was further calcined at 500° C. for 1 hour to obtain precious metal-supported zirconia-alumina C. 61.33 g of this precious metal-supported zirconia-alumina C and 90 mL of deionized water were mixed and wet milled to form a slurry. 0.0303 L of a cordierite carrier (trade name "Celcor" manufactured by Corning Incorporated, the number of cells: 400 cell/square inch of cross-sectional area), which was cut out into a column shape with a diameter of 24 mm and a length of 67 mm, was dipped in this slurry, wash coated and dried at 150° C. for 5 minutes, then air calcined at 500° C. for 1 hour, and treated at 500° C. for 3 hours under a stream with 5% hydrogen and 95% nitrogen to thus obtain a catalyst 1-c coated with a catalyst component in an amount of 61.33 g (0.887 g of platinum, 0.443 g of palladium, 60.0 g of zirconia-alumina C) per 1 L-volume of the substrate.

Example 1-4

1250.7 g of aluminum nitrate nonahydrate $(Al(NO_3)_3 \cdot 9H_2O)$ was completely dissolved in 0.82 L of deionized water, thereto was further added 150.0 g of an aqueous zirconyl nitrate solution (concentration of 20% by mass in $ZrO_2$ conversion), and the mixture was stirred well to prepare an aqueous mixed solution. This solution was dropped to 2 L of an aqueous solution that was obtained by adjusting to pH 9 with ammonia. During dropping, the solution was adjusted to a pH within the range from 7 to 10 with ammonia water at a temperature of 25° C. A precipitate was generated, filtered, washed well with deionized water, then dried at 120° C. for 8 hours, and calcined at 400° C. for 5 hours and at 700° C. for 5 hours to thus obtain zirconia-alumina D (15% by mass of zirconia, 85% by mass of alumina).

Then, 60 g of the zirconia-alumina D was impregnated with 42.22 g of an aqueous mixed solution obtained by diluting 7.86 g of an aqueous dinitrodiammine platinum solution containing platinum in an amount that corresponds to 0.887 g and 3.16 g of a palladium nitrate solution containing palladium in an amount that corresponds to 0.443 g with deionized water, the zirconia-alumina D was then dried at 120° C. for 8 hours to obtain powder, and the powder was further calcined at 500° C. for 1 hour to obtain precious metal-supported zirconia-alumina D. 61.33 g of this precious metal-supported zirconia-alumina C and 90 mL of deionized water were mixed and wet pulverized to form a slurry. 0.0303 L of a cordierite substrate(trade name "Celcor" manufactured by Corning Incorporated, the number of cells: 400 cell/square inch of cross-sectional area), which was cut out into a column shape with a diameter of 24 mm and a length of 67 mm, was dipped in this slurry, wash coated and dried at 150° C. for 5 minutes, then air calcined at 500° C. for 1 hour, and treated at 500° C. for 3 hours under a stream with 5% hydrogen and 95% nitrogen to thus obtain a catalyst 1-d coated with a catalyst component in an amount of 61.33 g (0.887 g of platinum, 0.443 g of palladium, 60.0 g of zirconia-alumina D) per 1 L-volume of the substrate.

Example 1-5

1030.1 g of aluminum nitrate nonahydrate $(Al(NO_3)_3 \cdot 9H_2O)$ was completely dissolved in 0.67 L of deionized water, thereto was further added 300.0 g of an aqueous zirconyl nitrate solution (concentration of 20% by mass in $ZrO_2$ conversion), and the mixture was stirred well to prepare an aqueous mixed solution. This solution was dropped to 2 L of an aqueous solution that was obtained by adjusting to pH 9 with ammonia. During dropping, the solution was adjusted to a pH within the range from 7 to 10 with ammonia water at a temperature of 25° C. A precipitate was generated, filtered, washed well with deionized water, then dried at 120° C. for 8 hours, and calcined at 400° C. for 5 hours and at 700° C. for 5 hours to thus obtain zirconia-alumina E (30% by mass of zirconia, 70% by mass of alumina).

Then, 60 g of the zirconia-alumina E was impregnated with 42.22 g of an aqueous mixed solution obtained by diluting 7.86 g of an aqueous dinitrodiammine platinum solution containing platinum in an amount that corresponds to 0.887 g and 3.16 g of a palladium nitrate solution containing palladium in an amount that corresponds to 0.443 g with deionized water, the zirconia-alumina E was then dried at 120° C. for 8 hours to obtain powder, and the powder was further calcined at 500° C. for 1 hour to obtain precious metal-supported zirconia-alumina E. 61.33 g of this precious metal-supported zirconia-alumina E and 90 mL of deionized water were mixed and wet milled to form a slurry. 0.0303 L of a cordierite substrate (trade name "Celcor" manufactured by Corning Incorporated, the number of cells: 400 cell/square inch of cross-sectional area), which was cut out into a column shape with a diameter of 24 mm and a length of 67 mm, was dipped in this slurry, wash coated and dried at 150° C. for 5 minutes, then air calcined at 500° C. for 1 hour, and treated at 500° C. for 3 hours under a stream with 5% hydrogen and 95% nitrogen to thus obtain a catalyst 1-e coated with a catalyst component in an amount of 61.33 g (0.887 g of platinum, 0.443 g of palladium, 60.0 g of zirconia-alumina E) per 1 L-volume of the substrate.

Comparative Example 1-1

735.8 g of aluminum nitrate nonahydrate $(Al(NO_3)_3 \cdot 9H_2O)$ was completely dissolved in 0.48 L of deionized water, thereto was further added 500.0 g of an aqueous zirconyl nitrate solution (concentration of 20% by mass in $ZrO_2$ conversion), and the mixture was stirred well to prepare an aqueous mixed solution. This solution was dropped to 2 L of an aqueous solution that was obtained by adjusting to pH 9 with ammonia. During dropping, the solution was adjusted to a pH within the range from 7 to 10 with ammonia water at a temperature of 25° C. A precipitate was generated, filtered, washed well with deionized water, then dried at 120° C. for 8 hours, and calcined at 400° C. for 5 hours and at 700° C. for 5 hours to thus obtain zirconia-alumina F (50% by mass of zirconia, 50% by mass of alumina).

Then, 60 g of the zirconia-alumina F was impregnated with 42.22 g of an aqueous mixed solution obtained by diluting 7.86 g of an aqueous dinitrodiammine platinum solution containing platinum in an amount that corresponds to 0.887 g and 3.16 g of a palladium nitrate solution containing palladium in an amount that corresponds to 0.443 g with deionized water, the zirconia-alumina F was then dried at 120° C. for 8 hours to obtain powder, and the powder was further calcined at 500° C. for 1 hour to obtain precious metal-supported zirconia-alumina F. 61.33 g of this precious metal-supported zirconia-alumina F and 90 mL of deionized water were mixed and wet milled to form a slurry. 0.0303 L of a cordierite substrate (trade name "Celcor" manufactured by Corning Incorporated, the number of cells: 400 cell/square inch of cross-sectional area), which was cut out into a column shape with a diameter of 24 mm and a length of 67 mm, was dipped in this slurry, wash coated and dried at 150° C. for 5 minutes, then air calcined at 500° C. for 1 hour, and treated at 500° C. for 3 hours under a stream with 5% hydrogen and 95% nitrogen to thus obtain a catalyst 1-f coated with a catalyst component in an amount of 61.33 g (0.887 g of platinum, 0.443 g of palladium, 60.0 g of zirconia-alumina F) per 1 L-volume of the substrate.

Comparative Example 1-2

1471.7 g of aluminum nitrate nonahydrate ($Al(NO_3)_3 \cdot 9H_2O$) was weighed and completely dissolved in 0.96 L of deionized water. This solution was dropped to 2 L of an aqueous solution that was obtained by adjusting to pH 9 with ammonia. During dropping, the solution was adjusted to a pH within the range from 7 to 10 with ammonia at a temperature of 25° C. A precipitate was generated, filtered, washed well with deionized water, then dried at 120° C. for 8 hours, and calcined at 400° C. for 5 hours and at 700° C. for 5 hours to thus obtain zirconia-alumina G (0% by mass of zirconia, 100% by mass of alumina).

Then, the alumina G was impregnated with 42.22 g of an aqueous mixed solution obtained by diluting 7.86 g of an aqueous dinitrodiammine platinum solution containing platinum in an amount that corresponds to 0.887 g and 3.16 g of a palladium nitrate solution containing palladium in an amount that corresponds to 0.443 g with deionized water, the alumina was then dried at 120° C. for 8 hours to obtain powder, and the powder was further calcined at 500° C. for 1 hour to obtain precious metal-supported alumina. 61.33 g of this precious metal-supported alumina and 90 mL of deionized water were mixed and wet milled to form a slurry. 0.0303 L of a cordierite substrate (trade name "Celcor" manufactured by Corning Incorporated, the number of cells: 400 cell/square inch of cross-sectional area), which was cut out into a column shape with a diameter of 24 mm and a length of 67 mm, was dipped in this slurry, wash coated and dried at 150° C. for 5 minutes, then air calcined at 500° C. for 1 hour, and treated at 500° C. for 3 hours under a stream with 5% hydrogen and 95% nitrogen to thus obtain a catalyst 1-g coated with a catalyst component in an amount of 61.33 g (0.887 g of platinum, 0.443 g of palladium, 60.0 g of alumina G) per 1 L-volume of the substrate.

<XRD Analysis>

XRD analysis (fully automatic multi-purpose X-ray diffractometer, X' Pert PRO MPD (PW3040/60) X ray tube: Cu, manufactured by Spectris Co., Ltd.) were carried out on respective carriers of the zirconia-alumina A to F obtained in Examples 1-1 to 1-5 and Comparative Example 1-1 (FIG. 1).

It is found as shown in FIG. 1 that since carriers of the zirconia-alumina A (zirconia content is 2% by mass), the zirconia-alumina B (zirconia content is 5% by mass) and the zirconia-alumina C (zirconia content is 10% by mass) do not have peaks between 2θ 29° and 32°, they have no tetragonal crystal. It is also found that the zirconia-alumina D (zirconia content is 15% by mass), the zirconia-alumina E (zirconia content is 30% by mass) and the zirconia-alumina F (zirconia content is 50% by mass) have peaks between 2θ 29° and 32° and have tetragonal crystals. In addition, peaks that slightly appear around between 2θ 27° and 29° are peaks derived from a monoclinic crystal of zirconia.

Next, the zirconia-alumina D (zirconia content is 15% by mass content is 15% by mass), the zirconia-alumina E (zirconia content is 30) and the zirconia-alumina F (zirconia content is 50% by mass) were mixed with alumina (G) shown in Comparative Example 1-2 and zirconia in the measurement samples were diluted to 10% by mass. These were referred to as the zirconia-alumina D' (15% by mass of the zirconia content was diluted to 10% by mass), the zirconia-alumina E' (30% by mass of the zirconia content was diluted to 10% by mass), and the zirconia-alumina F' (50% by mass of the zirconia content was diluted to 10% by mass). XRD analysis (fully automatic multi-purpose X-ray diffractometer, X' Pert PRO MPD (PW3040/60) X ray tube: Cu, manufactured by Spectris Co., Ltd.) were carried out on respective carriers of the zirconia-alumina D', E' and F' and the zirconia-alumina C (FIG. 2).

Figure 2:
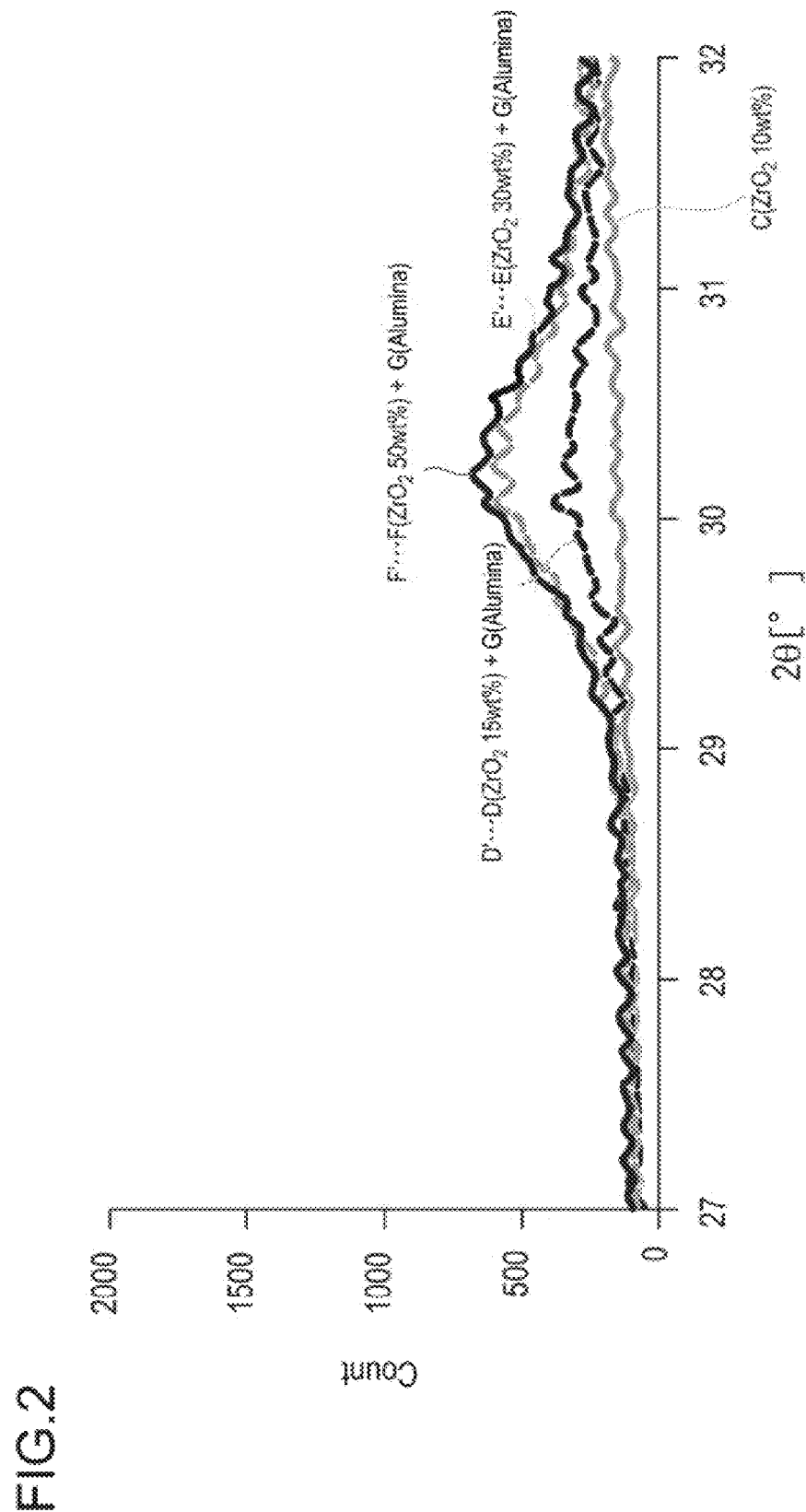
FIG. 2 is a graph showing powder X-ray diffractometry measured using carriers in Examples 1-3 to 1-5 and Comparative Example 1-1.

It is found from FIG. 2 that when the zirconia-alumina D', E' and F' are compared to the zirconia-alumina C, even though a zirconia content is 10% by mass, peak intensities between 2θ 29° and 32° are different.

Therefore, this results suggests that tetragonal crystals were present in the zirconia-alumina D', E' and F', and on the other hand, tetragonal crystals do not exist in the zirconia-alumina A, B and C.

Accordingly, it can be suggested that tetragonal crystals are present in the zirconia-alumina D, E and F and the zirconia-alumina D, E and F have a metal oxide (zirconia) with a primary particle diameter of 5 nm or more. Furthermore, it can be considered that peaks are not observed in the zirconia-alumina A, B and C between 2θ 27° and 29° and between 2θ 29° and 32° and thus zirconia in zirconia-alumina has a very fine crystal structure with a particle diameter of less than 5 nm or an amorphous structure.

Particle diameters of the zirconia-alumina D, E and F, in which tetragonal crystals were observed, were calculated from peaks between 2θ 29° and 32° (peaks of tetragonal crystals), using the Scherrer's equation. Note that a crystallite diameter was found as a particle diameter.

[Formula 1]

$$D = K\lambda/\beta \cos\theta \qquad \text{Scherrer's equation}$$

D: crystallite diameter (a crystallite diameter is used as a particle diameter)
K: form factor (0.9 is used)
λ: X ray wavelength (1.5406 Å)
β: peak width after correcting extension of diffraction line due to device
θ: diffraction angle As a result, average vales of particle diameters were the zirconia-alumina D: 5 nm, the zirconia-alumina E: 7 to 8 nm, and the zirconia-alumina F: 7 to 8 nm.

<Electron Microscope Observation>

Electron microscope observation (H-7650, manufactured by Hitachi High-Technologies Corporation) was carried out on respective carriers of the zirconia-alumina A to G obtained in Examples 1-1 to 1-5 and Comparative Examples 1-1 and 1-2, and it was able to be confirmed that a particle diameter of alumina is from 10 to 30 nm.

<Thermal Aging>

Thermal aging were carried out on respective catalysts 1-a, 1-b, 1-c, 1-d, 1-e, 1-f and 1-g, which were shown in Examples 1-1 to 1-5 and Comparative Examples 1-1 and 1-2, by treating the catalysts at 700° C. for 30 hours in an electric furnace in an atmosphere with 6% by volume of vapor, 10% by volume of oxygen and 84% by volume of nitrogen. This is thermal aging as assumed that the catalysts are used in diesel engine.

<Evaluation of Performance of Catalysts for Exhaust Gas Purification>

Figure 3:
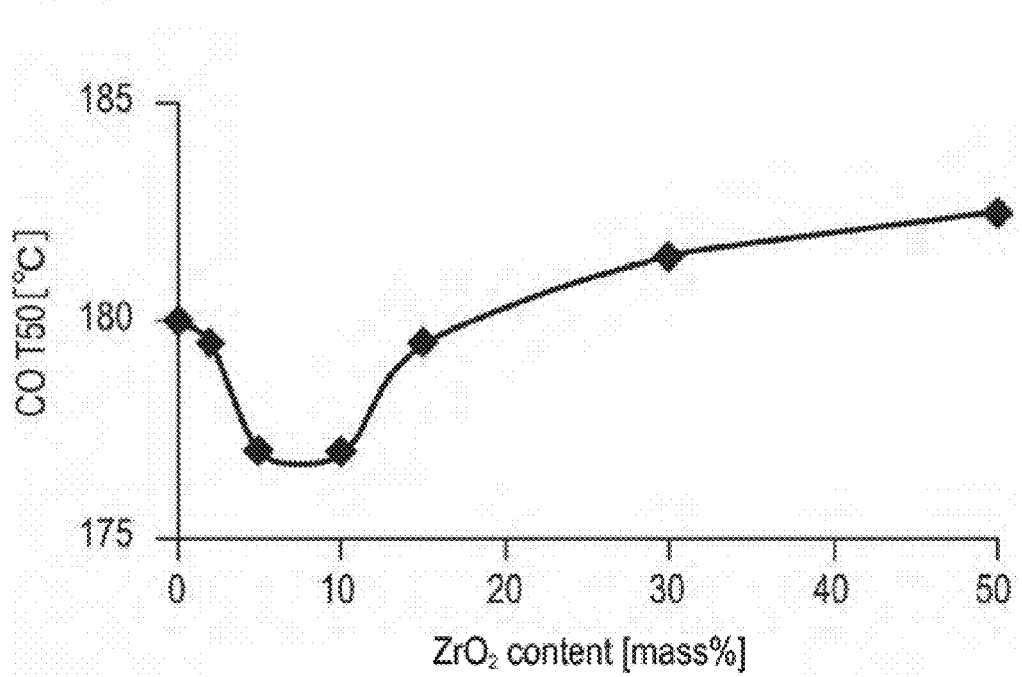
FIG. 3 is a graph showing $ZrO_2$ contents and 50% CO conversion in carriers of catalysts in Examples 1-3 to 1-5 and Comparative Examples 1-1 and 1-2.
Figure 4:
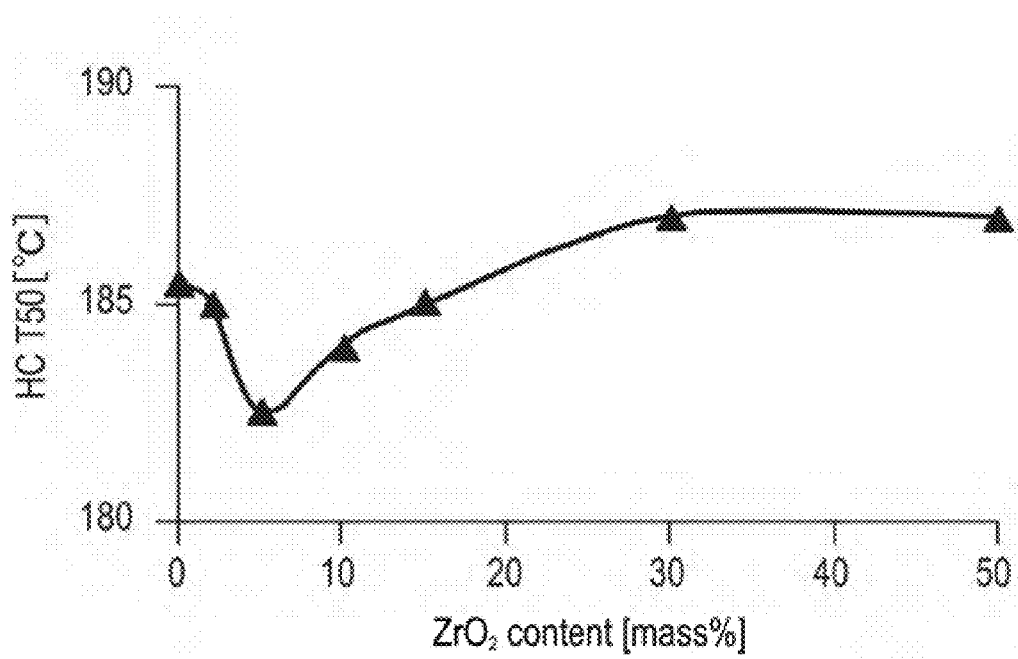
FIG. 4 is a graph showing $ZrO_2$ contents and 50% HC conversion in carriers of catalysts in Examples 1-3 to 1-5 and Comparative Examples 1-1 and 1-2.

While a gas (spatial velocity of 40000 hr$^{-1}$, gas linear velocity of 0.75 m/sec) under the condition in Table 1 is flown through each catalyst after the above described thermal treatment, when the temperature of the gas is increased at a temperature increasing rate of 20° C./min, FIG. 3 and FIG. 4 showed graphs of plotting $ZrO_2$ contents in zirconia-alumina and alumina that are precious metal-supported carriers in respective catalysts, assuming that an inlet temperature of a catalyst at the time when 50% of carbon monoxide is purified in a catalyst outlet is COT50, and in the same manner, an inlet temperature of a catalyst at the time when 50% of propylene is purified in a catalyst outlet is HCT50.

TABLE 1

Conditions of reaction gas

| Components | Concentrations |
|---|---|
| $C_3H_6$ | 280 ppm C1* |
| CO | 1000 ppm |
| NO | 80 ppm |
| $O_2$ | 12% |
| $CO_2$ | 6% |
| $H_2O$ | 7% |
| $N_2$ | BALANCE |

C1*: C1 conversion

TABLE 2

$ZrO_2$ contents in catalysts (% by mass)

| Catalyst names | $ZrO_2$ concentrations in precious metal-supported carriers (zirconia-alumina or alumina) [% by mass] |
|---|---|
| 1-a | 2 |
| 1-b | 5 |
| 1-c | 10 |
| 1-d | 15 |
| 1-e | 30 |
| 1-f | 50 |
| 1-g | 0 |

It was able to be confirmed as shown in FIG. 3 and FIG. 4 that catalysts 1-a, 1-b, 1-c, 1-d and 1-e in Examples 1-1 to 1-5 can oxidize CO and propylene at a lower temperature as compared to catalysts 1-f and 1-g in Comparative Examples 1-1 and 1-2. On the other hand, it was able to be also confirmed that the catalyst 1-f with excessive $ZrO_2$ conversely hardly causes oxidation of CO and propylene.

Example 2-1

6917 g of aluminum nitrate nonahydrate ($Al(NO_3)_3 \cdot 9H_2O$) was completely dissolved in 4.5 L of deionized water, thereto were further added 250.0 g of an aqueous zirconyl nitrate solution (concentration of 20% by mass in $ZrO_2$ conversion) and 100.0 g of a sulfuric acid solution of titanium sulfate (concentration of 30% by mass in $TiO_2$ conversion), and the mixture was stirred well to prepare an aqueous mixed solution. This solution was dropped to 10 L of an aqueous solution at 25° C., which was obtained by adjusting to pH 10 with ammonia. During dropping, the solution was adjusted to a pH within the range from 7 to 10 with ammonia water. A precipitate was generated, filtered, washed well with deionized water, then dried at 120° C. for 8 hours, and calcined at 400° C. for 5 hours and at 700° C. for 5 hours to thus obtain titania-zirconia-alumina A (0.1% by mass of titania, 5.0% by mass of zirconia, 94.9% by mass of alumina).

700.8 g of the titania-zirconia-alumina A (0.1% by mass of titania, 5.0% by mass of zirconia, 94.9% by mass of alumina) was impregnated with 480 mL of an aqueous mixed solution obtained by diluting an aqueous dinitrodiammine platinum solution containing platinum in an amount that corresponds to 12.6 g and a palladium nitrate solution containing palladium in an amount that corresponds to 6.3 g with deionized water, the titania-zirconia-alumina A was then dried at 120° C. for 8 hours to obtain powder, and the powder was further calcined at 500° C. for 1 hour to obtain 719.7 g of precious metal-supported titania-zirconia-alumina A. This precious metal-supported titania-zirconia-alumina A, 280.3 g of beta-zeolite (silica/alumina ratio (molar ratio)=35, surface area of 543 m$^2$/g, average particle diameter of 0.6 μm) and 1200 mL of deionized water were mixed and wet milled to form a slurry. A cordierite substrate with a diameter of 103 mm and a length of 130 mm (manufactured by NGK Insulators, Ltd. the number of cells: 600 cell/square inch of cross-sectional area) was dipped in this slurry and wash coated, an excessive slurry was removed, and the carrier was then dried at 150° C. for 5 minutes, air calcined at 500° C. for 1 hour, and treated at 500° C. for 3 hours under a stream with 5% hydrogen and 95% nitrogen to thus obtain a catalyst 2-a coated with a catalyst component in an amount of 148.2 g (1.8 g of platinum, 0.9 g of palladium, 100 g of titania-zirconia-alumina A, 40 g of beta-zeolite) per 1 L-volume of the substrate.

Example 2-2

Titania-zirconia-alumina B (1.0% by mass of titania, 5.0% by mass of zirconia, 94.0% by mass of alumina) was obtained in the same method as in Example 2-1, changing amounts of aluminum nitrate nonahydrate, an aqueous zirconyl nitrate solution and a sulfuric acid solution of titanium sulfate.

Next, the catalyst 2-b was obtained in the same method as in Example 2-1, except for changing the titania-zirconia-alumina A to the titania-zirconia-alumina B (1.0% by mass of titania, 5.0% by mass of zirconia, 94.0% by mass of alumina).

Example 2-3

Titania-zirconia-alumina C (5.0% by mass of titania, 5.0% by mass of zirconia, 90.0% by mass of alumina) was obtained in the same method as in Example 2-1, changing amounts of aluminum nitrate nonahydrate, an aqueous zirconyl nitrate solution and a sulfuric acid solution of titanium sulfate.

Next, the catalyst 2-c was obtained in the same method as in Example 2-1, except for changing the titania-zirconiaalumina A to the titania-zirconia-alumina C (5.0% by mass of titania, 5.0% by mass of zirconia, 90.0% by mass of alumina).

Example 2-4

6917 g of aluminum nitrate nonahydrate (Al(NO$_3$)$_3$·9H$_2$O) was completely dissolved in 4.5 L of deionized water, thereto was further added 250.0 g of an aqueous zirconyl nitrate solution (concentration of 20% by mass in ZrO$_2$ conversion) and the mixture was stirred well to prepare an aqueous mixed solution. This solution was dropped to 10 L of an aqueous solution at 25° C., which was obtained by adjusting to pH 10 with 47.3 g of sodium metasilicate and ammonia. During dropping, the solution was adjusted to a pH within the range from 7 to 10 with ammonia water. After completion of dropping, the pH was adjusted so as to be around neutral (pH 5 to 8) with nitric acid. A generated precipitate was filtered, washed well with deionized water, then dried at 120° C. for 8 hours, and fired at 400° C. for 5 hours and at 700° C. for 5 hours to thus obtain silica-zirconia-alumina D (0.1% by mass of silica, 5.0% by mass of zirconia, 94.9% by mass of alumina).

Next, the catalyst 2-d was obtained in the same method as in Example 2-1, except for changing the titania-zirconia-alumina A to the silica-zirconia-alumina D (0.1% by mass of silica, 5.0% by mass of zirconia, 94.9% by mass of alumina).

Example 2-5

Silica-zirconia-alumina E (1.0% by mass of silica, 5.0% by mass of zirconia, 94.0% by mass of alumina) was obtained in the same method as in Example 2-4, changing amounts of aluminum nitrate nonahydrate, an aqueous zirconyl nitrate solution and sodium metasilicate.

Next, the catalyst 2-e was obtained in the same method as in Example 2-1, except for changing the titania-zirconia-alumina A to the silica-zirconia-alumina E (1.0% by mass of silica, 5.0% by mass of zirconia, 94.0% by mass of alumina).

Example 2-6

Silica-zirconia-alumina F (5.0% by mass of silica, 5.0% by mass of zirconia, 90.0% by mass of alumina) was obtained in the same method as in Example 2-4, changing amounts of aluminum nitrate nonahydrate, an aqueous zirconyl nitrate solution and sodium metasilicate.

Next, the catalyst 2-f was obtained in the same method as in Example 2-1, except for changing the titania-zirconia-alumina A to the silica-zirconia-alumina F (5.0% by mass of silica, 5.0% by mass of zirconia, 90.0% by mass of alumina).

Comparative Example 2-1

Zirconia-alumina G (zirconia 5.0% by mass, alumina 95.0% by mass) was obtained in the same method as in Example 2-1, changing amounts of aluminum nitrate nonahydrate, an aqueous zirconyl nitrate solution and a sulfuric acid solution of titanium sulfate.

Next, the catalyst 2-g was obtained in the same method as in Example 2-1, except for changing the titania-zirconia-alumina A to zirconia-alumina G (5.0% by mass of zirconia, 95.0% by mass of alumina).

<XRD Analysis>

XRD analysis (fully automatic multi-purpose X-ray diffractometer, X' Pert PRO MPD (PW3040/60) X ray tube: Cu, manufactured by Spectris Co., Ltd.) were carried out on respective carriers of the titania-zirconia-alumina A to C, the silica-zirconia-alumina D to F and the zirconia-alumina G obtained in Examples 2-1 to 2-6 and Comparative Example 2-1 (FIG. 5 and FIG. 6).

(1) XRD Analysis of Titania-Zirconia-Alumina

Figure 5:
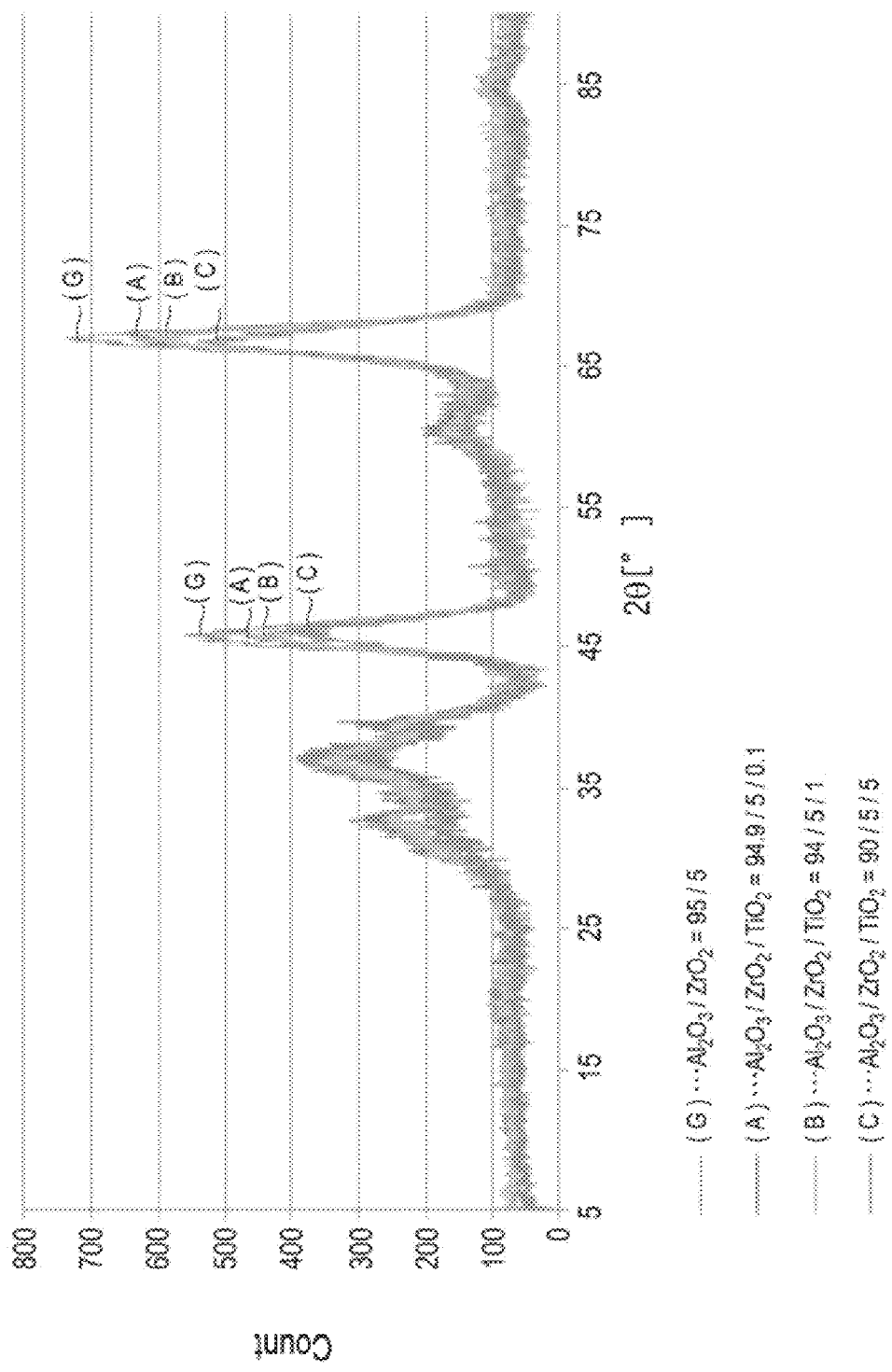
FIG. 5 is a graph showing powder X-ray diffractometry of carriers in Examples 2-1 to 2-3 and Comparative Example 2-1.
Figure 6:
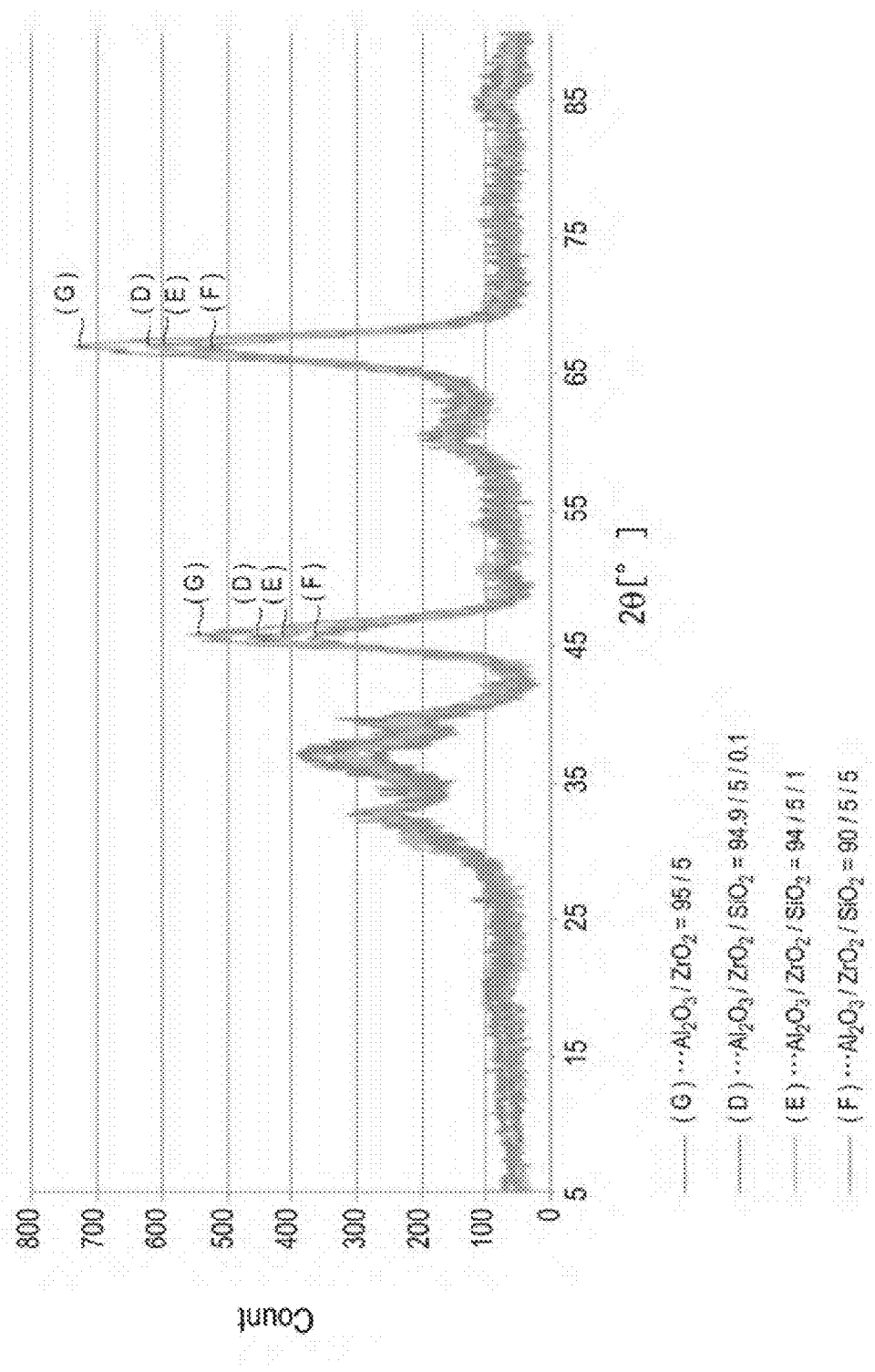
FIG. 6 is a graph showing powder X-ray diffractometry of carriers in Examples 2-4 to 2-6 and Comparative Example 2-1.

In the graph in FIG. 5, (A) expresses a carrier of the titania-zirconia-alumina A (0.1% by mass of titania, 5.0% by mass of zirconia, 94.9% by mass of alumina) obtained in Example 2-1, (B) expresses a carrier of the titania-zirconia-alumina B (1.0% by mass of titania, 5.0% by mass of zirconia, 94.0% by mass of alumina) obtained in Example 2-2, (C) expresses a carrier of the titania-zirconia-alumina C (5.0% by mass of titania, 5.0% by mass of zirconia, 90.0% by mass of alumina) obtained in Example 2-3, and (G) expresses a carrier of the zirconia-alumina G (5.0% by mass of zirconia, 95.0% by mass of alumina) obtained in Comparative Example 2-1.

In the graph shown in FIG. 5, all peaks observed between 2θ 30° and 70° were peaks derived from alumina. Zirconia has a peak between 2θ 29° and 32° (tetragonal crystal) and between 2θ 27° and 29° (monoclinic crystal), but there was no such peak observed in (A) to (C). Accordingly, it is assumed that zirconia in carriers of the titania-zirconia-alumina (A) to (C) has a very fine crystal structure with a particle diameter of less than 5 nm or an amorphous structure. In addition, titania has a peak at around 2θ 25° (anatase-type crystal) and at around 2θ 28° (rutile-type crystal), but there was no such peak observed in (A) to (C). Accordingly, it is assumed that titania in carriers of the titania-zirconia-alumina (A) to (C) has a very fine crystal structure with a particle diameter of less than 5 nm or an amorphous structure.

(2) XRD Analysis on Silica-Zirconia-Alumina

In the graph in FIG. 6, (D) expresses a carrier of the silica-zirconia-alumina D (0.1% by mass of silica, 5.0% by mass of zirconia, 94.9% by mass of alumina) obtained in Example 2-4, (E) expresses a carrier of the silica-zirconia-alumina E (1.0% by mass of silica, 5.0% by mass of zirconia, 94.0% by mass of alumina) obtained in Example 2-5, (F) expresses a carrier of the silica-zirconia-alumina F (5.0% by mass of silica, 5.0% by mass of zirconia, 90.0% by mass of alumina) obtained in Example 2-6, and (G) expresses a carrier of the zirconia-alumina G (5.0% by mass of zirconia, 95.0% by mass of alumina) obtained in Comparative Example 2-1.

In the graph shown in FIG. 6, all peaks observed between 2θ 30 and 70° were peaks derived from alumina. No peak of a zirconia crystal (between 2θ 29° and 32° (tetragonal crystal) and between 2θ 27° and 29° (monoclinic crystal)) was observed in (D) to (F), and accordingly, it is assumed that zirconia in carriers of silica-zirconia-alumina (D) to (F) has a very fine crystal structure with a particle diameter of less than 5 nm or an amorphous structure. In addition, silica has a peak around between 2θ 20° to 28°, but there was no such peak observed in (D) to (F). Accordingly, it is assumed that silica in carriers of silica-zirconia-alumina (D) to (F) has a very fine crystal structure with a particle diameter of less than 5 nm or an amorphous structure.

<Electron Microscope Observation>

Electron microscope observation (H-7650, manufactured by Hitachi High-Technologies Corporation) was carried out on respective carriers of titania-zirconia-alumina A to C, silica-zirconia-alumina D to F, and zirconia-alumina G obtained in Examples 2-1 to 2-6 and Comparative Example 2-1, and it was able to be confirmed that a particle diameter of alumina is from 10 to 30 nm.

<Aging Treatment>

The following treatments 1, 2 and 3 were carried out for aging of catalysts in turn.

1. Thermal Aging

A thermal treatment was carried out on respective catalysts 2-a to 2-g shown in Examples 2-1 to 2-6 and Comparative Example 2-1 by aging the carriers at 700° C. for 50 hours in an electric furnace in the atmosphere.

2. Sulfur Poisoning

Catalysts after the thermal tolerance treatment were exposed to an exhaust gas flow for 100 minutes using light oil containing 400 ppm of a sulfur component as a fuel in a diesel engine with 3.1 L displacement, under the condition of a torque of 15 Nm and a rotational number of 2000 rpm. In addition, the total amount of the sulfur component in the exhaust gas was 10.8 g (±10%) in conversion of sulfur dioxide.

3. Regeneration Treatment

No. JIS2 light oil was added to an exhaust gas flow from the catalyst upper flow side of the exhaust gas flow using the No. JIS2 light oil as a fuel in the same engine in sulfur poisoning described in 2, under the condition of a torque of 13 Nm and a rotational number of 2000 rpm and maintained for 15 minutes. In addition, the adding amount of the No. JIS2 light oil is an amount in a level that a temperature at the outlet of the catalyst is 670° C. with combustion heat on an oxidation catalyst. As described above, the sulfur component deposited in sulfur poisoning described in 2 was partially desorbed by combustion heat.

This is aging which simulates deterioration of catalytic performance caused by thermal aging and poisoning due to a sulfur component in use of a general diesel engine.

<Evaluation of Performance of Catalyst for Exhaust Gas Purification>

Evaluation of purification performance on CO was carried out on each catalyst after the above described aging treatment, by partially diverging an exhaust gas from an exhaust gas flow route of a 9.84 L-diesel engine and allowing the exhaust gas to pass through the catalyst. The evaluation was performed changing from being idle to a torque of 250 Nm and a rotational number of 1110 rpm over 13 seconds. During the performance evaluation, the exhaust gas temperature at a catalyst inlet increased from 110° C. to 160° C. The results were shown in FIG. 7 and FIG. 8.

Figure 7:
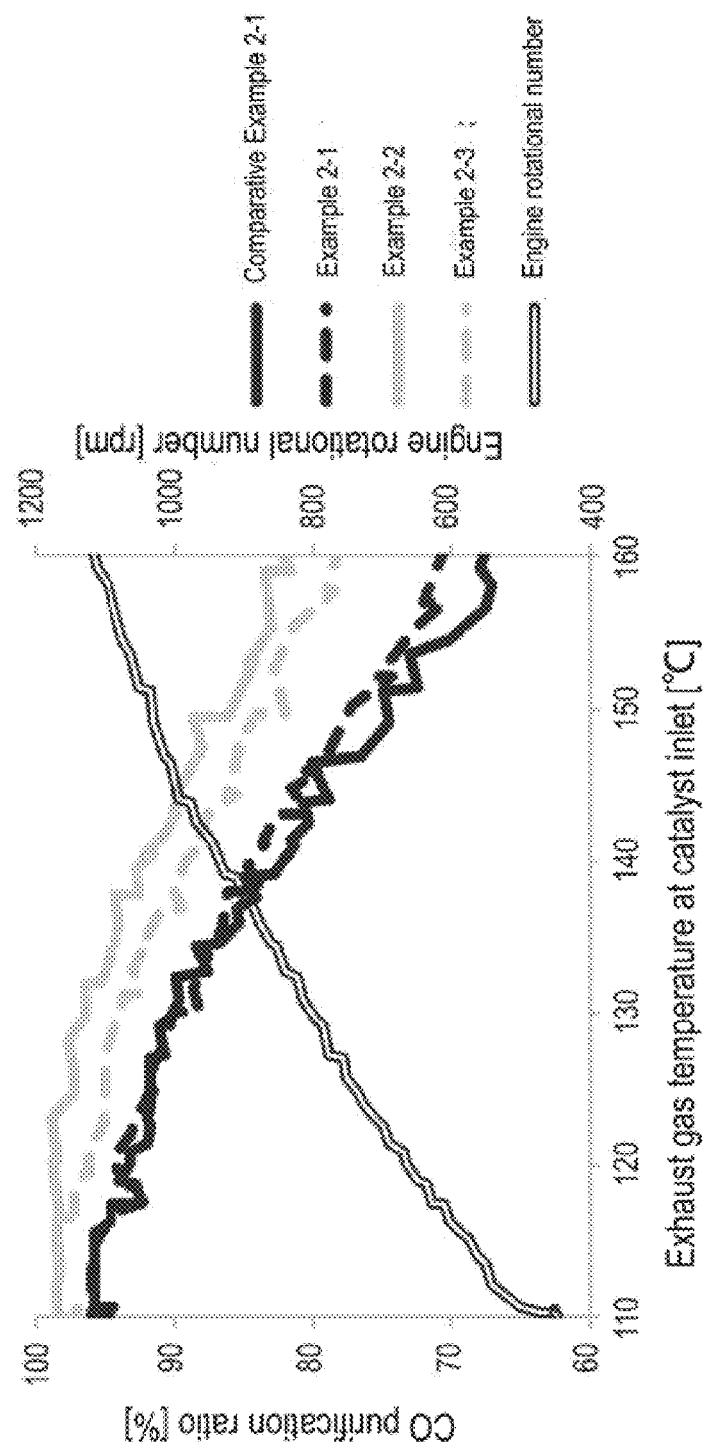
FIG. 7 is a graph showing CO purification ability measured using catalysts in Examples 2-1 to 2-3 and Comparative Example 2-1.
Figure 8:
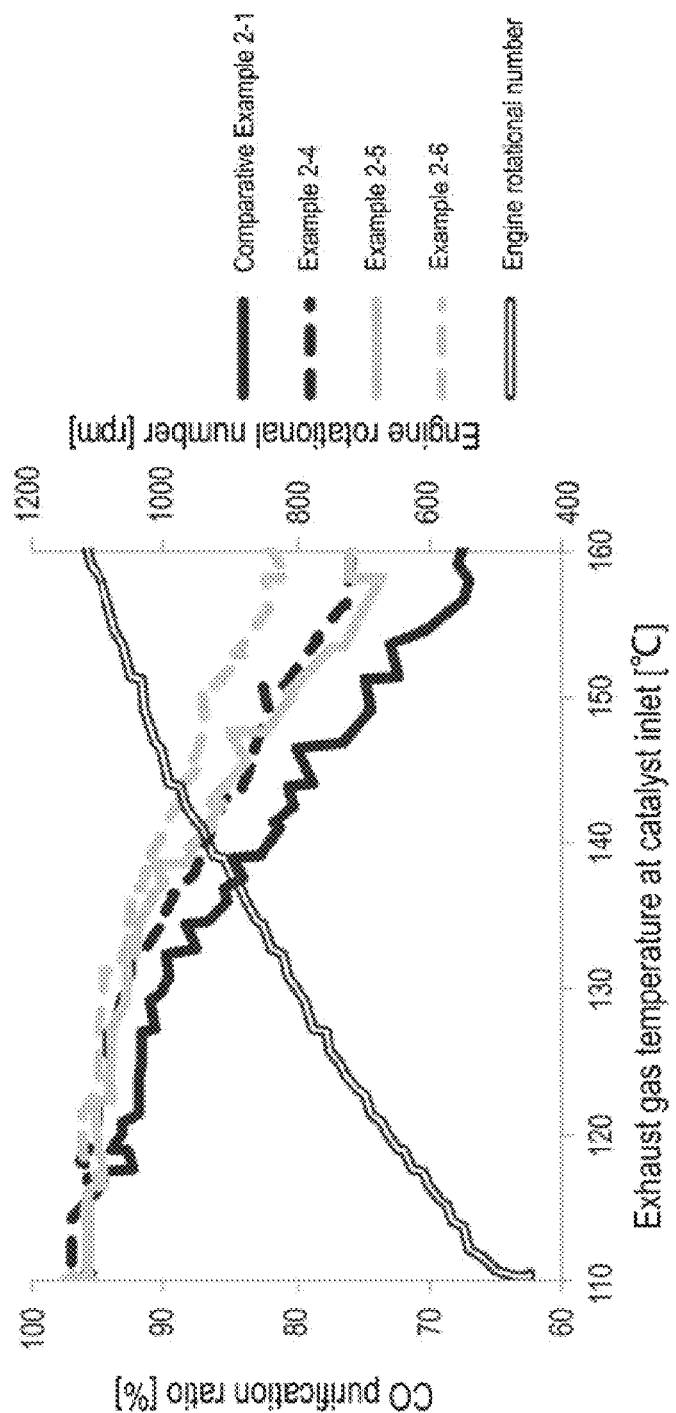
FIG. 8 is a graph showing CO purification ability measured using catalysts in Examples 2-4 to 2-6 and Comparative Example 2-1.

As obvious from FIG. 7 and FIG. 8, as compared to a catalyst obtained by supporting a precious metal on zirconia-alumina, zirconia-alumina including titania and silica showed high CO oxidation performance even after poisoning with a sulfur component in an exhaust gas.

In addition, the present application is based on Japanese Patent Application No. 2011-047643 filed on Mar. 4, 2011, and Japanese Patent Application No. 2011-101608 filed on Mar. 28, 2011, the disclosures of which are incorporated herein by reference.

The invention claimed is:

1. A catalyst for exhaust gas purification, which is obtained by having a carrier that comprises
aluminum oxide ($Al_2O_3$) and
one or more metal oxides selected from the group consisting of zirconium oxide ($ZrO_2$), cerium oxide ($CeO_2$), yttrium oxide ($Y_2O_3$), neodymium oxide ($Nd_2O_3$), silicon oxide ($SiO_2$) and titanium oxide ($TiO_2$)
support one or more catalyst components selected from the group consisting of gold (Au), silver (Ag), platinum (Pt), palladium (Pd), rhodium (Rh), iridium (Ir), ruthenium (Ru) and osmium (Os),
wherein the metal oxides have particle diameters of less than 10 nm,
and wherein a particle diameter of the aluminum oxide is 10 to 100 nm.

2. The catalyst for exhaust gas purification according to claim 1, wherein a mass ratio of the aluminum oxide and the metal oxide is 99.5:0.5 to 80:20.

3. The catalyst for exhaust gas purification according to claim 1, wherein the metal oxide is zirconium oxide ($ZrO_2$) or a mixture obtained by mixing zirconium oxide ($ZrO_2$) with one or more selected from the group consisting of cerium oxide ($CeO_2$), yttrium oxide ($Y_2O_3$), neodymium oxide ($Nd_2O_3$), silicon oxide ($SiO_2$) and titanium oxide ($TiO_2$).

4. The catalyst for exhaust gas purification according to claim 1, wherein the carrier comprises
60 to 99.49 parts by mass of aluminum oxide ($Al_2O_3$),
0.5 to 20 parts by mass of zirconium oxide ($ZrO_2$), and
one or more metal oxides selected from the group consisting of 0.01 to 10 parts by mass of silicon oxide ($SiO_2$) and 0.01 to 10 parts by mass of titanium oxide ($TiO_2$) (the total mass of the aluminum oxide, the zirconium oxide and the metal oxides is 100 parts by mass).

5. The catalyst for exhaust gas purification according to claim 1, wherein the catalyst component is Pt, or Pt and Pd, and the mass ratio of Pt and Pd is 1:0 to 1:1.

6. A method for producing the catalyst for exhaust gas purification set forth in claim 1, comprising a step of adding a solution that contains
a water-soluble compound of Al and
a water-soluble compound of one or more metals selected from the group consisting of Zr, Ce, Y, Nd, Si and Ti to an alkaline solution to be mixed and coprecipitating to obtain a coprecipitated product, and then calcining the coprecipitated product to thus obtain a carrier comprising the aluminum oxide and the metal oxide,
wherein a particle diameter of the aluminum oxide is 10 to 100 nm.

7. The method for producing the catalyst for exhaust gas purification according to claim 6, further comprising a step of impregnating the carrier that contains the aluminum oxide and the metal oxide with an aqueous solution of a compound of a catalyst component and then firing the carrier obtained by the impregnation to obtain a catalyst component-supported carrier.

8. The method for producing the catalyst for exhaust gas purification according to claim 6, further comprising a step of preparing a slurry that comprises the catalyst component-supported carrier, or the catalyst component-supported carrier and a refractory inorganic oxide (supported component), and coating the slurry to a three-dimensional structure.

9. An exhaust gas purification method, wherein an exhaust gas is processed with a catalyst obtained by the method set forth in claim 6, or a catalyst for exhaust gas purification, which is obtained by having a carrier that comprises:
aluminum oxide ($Al_2O_3$) and
one or more metal oxides selected from the group consisting of zirconium oxide ($ZrO_2$), cerium oxide ($CeO_2$), yttrium oxide ($Y_2O_3$), neodymium oxide ($Nd_2O_3$), silicon oxide ($SiO_2$) and titanium oxide ($TiO_2$)
support one or more catalyst components selected from the group consisting of gold (Au), silver (Ag), platinum (Pt), palladium (Pd), rhodium (Rh), iridium (Ir), ruthenium (Ru) and osmium (Os), wherein the metal oxides have particle diameters of less than 10 nm,
and wherein a particle diameter of the aluminum oxide is 10 to 100 nm.

* * * * *